US009977580B2

(12) United States Patent
Stokman et al.

(10) Patent No.: US 9,977,580 B2
(45) Date of Patent: May 22, 2018

(54) EASY-TO-USE DESKTOP SCREEN RECORDING APPLICATION

(71) Applicant: Ilos Co., St. Paul, MN (US)

(72) Inventors: Nick Stokman, Crosby, MN (US); Sean Higgins, Crosby, MN (US)

(73) Assignee: Ilos Co., St. Paul, MN (US)

( * ) Notice: Subject to any disclaimer, the term of this patent is extended or adjusted under 35 U.S.C. 154(b) by 522 days.

(21) Appl. No.: 14/630,510

(22) Filed: Feb. 24, 2015

(65) Prior Publication Data

US 2015/0242104 A1    Aug. 27, 2015

Related U.S. Application Data

(60) Provisional application No. 61/943,745, filed on Feb. 24, 2014, provisional application No. 62/060,394, filed on Oct. 6, 2014.

(51) Int. Cl.

| | |
|---|---|
| *G06F 3/0484* | (2013.01) |
| *H04N 5/76* | (2006.01) |
| *G11B 27/10* | (2006.01) |
| *G11B 27/28* | (2006.01) |
| *G11B 27/00* | (2006.01) |
| *G09B 5/06* | (2006.01) |
| *H04N 9/82* | (2006.01) |
| *G11B 27/031* | (2006.01) |

(52) U.S. Cl.
CPC ...... *G06F 3/04845* (2013.01); *G06F 3/04842* (2013.01); *G09B 5/065* (2013.01); *G11B 27/005* (2013.01); *G11B 27/031* (2013.01); *G11B 27/105* (2013.01); *G11B 27/28* (2013.01); *H04N 5/76* (2013.01); *H04N 9/8205* (2013.01)

(58) Field of Classification Search
CPC ..... G06F 3/0482; G06F 3/0484; G06F 3/0481
See application file for complete search history.

(56) References Cited

U.S. PATENT DOCUMENTS

| | | |
|---|---|---|
| 5,926,611 A | 7/1999 | Yang et al. |
| 6,392,665 B1 | 5/2002 | Argabright et al. |
| 7,429,990 B2 | 9/2008 | Congdon et al. |

(Continued)

OTHER PUBLICATIONS

Lavrov, Valeri, "Screen Recording System for the Windows Desktop", KORUS Information Technology, (2004), 107.

(Continued)

*Primary Examiner* — David Choi
(74) *Attorney, Agent, or Firm* — Schwegman Lundberg & Woessner, P.A.

(57) ABSTRACT

Systems and methods for computer screen recording are described herein. In an embodiment, a web-based application includes a screen recorder, a video transcoder, and a video upload manager. The screen recorder records video tutorials, the video transcoder transcodes the recorded video tutorials, and the upload manager uploads the transcoded video tutorial to a server. The server analyzes the uploaded video tutorial to determine search terms that are relevant to the uploaded video tutorial, and associates the determined search terms with the uploaded video tutorial. The server also receives from users search queries containing search terms, searches for video tutorials related to the search terms, and returns a search query result containing links to the related video tutorials.

19 Claims, 30 Drawing Sheets

(56) References Cited

U.S. PATENT DOCUMENTS

| | | |
|---|---|---|
| 7,970,263 B1 | 6/2011 | Asch |
| 8,019,003 B2 | 9/2011 | Godwin |
| 8,266,665 B2 | 9/2012 | Beyabani et al. |
| 8,358,903 B1 | 1/2013 | Meads et al. |
| 9,407,858 B2 | 8/2016 | Castiglione |
| 2004/0155910 A1 | 8/2004 | Chang et al. |
| 2006/0103729 A1 | 5/2006 | Burns et al. |
| 2007/0136295 A1* | 6/2007 | Gorodyansky ... G06F 17/30867 |
| 2008/0126191 A1 | 5/2008 | Schiavi |
| 2011/0102442 A1 | 5/2011 | Ibrahim et al. |
| 2012/0057850 A1* | 3/2012 | Klappert .......... H04N 21/23424 386/278 |
| 2013/0024758 A1* | 1/2013 | Darby ................ G06F 17/30867 715/205 |
| 2013/0081098 A1 | 3/2013 | Kinghart |
| 2013/0083210 A1 | 4/2013 | Beckham et al. |
| 2013/0142332 A1 | 6/2013 | Ramos et al. |
| 2013/0162817 A1* | 6/2013 | Bernal ............... G06K 9/00228 348/143 |
| 2013/0308922 A1* | 11/2013 | Sano .................. H04N 21/4316 386/245 |
| 2014/0222819 A1* | 8/2014 | Dies .................. G06F 17/30707 707/740 |
| 2015/0007231 A1* | 1/2015 | Mule .................. H04N 21/4828 725/41 |
| 2015/0235399 A1* | 8/2015 | Shechtman ............. G06T 11/60 345/639 |
| 2015/0242104 A1* | 8/2015 | Stokman ............. G06F 3/04845 715/723 |
| 2017/0010903 A1* | 1/2017 | Kidron .................. G06F 9/4446 |

OTHER PUBLICATIONS

Marder, Mattias, et al., "Lightweight Searchable Screen Video Recording", Visual Communications and Image Processing (VCIP), IEEE, (2012), 6 pgs.

Woosley, J, "Use of Screen Recording Software to Create Video Tutorials for Dermatopathology Education", J Cutan Pathol 32 71-123, Abstract only, (2005), p. 122.

Ziewer, Peter, "Navigational Indices and Full-Text Search by Automated Analyses of Screen Recorded Data", World Conference on E-Learning in Corporate, Government, Healthcare, and Higher Education, (2004), 8 pgs.

\* cited by examiner

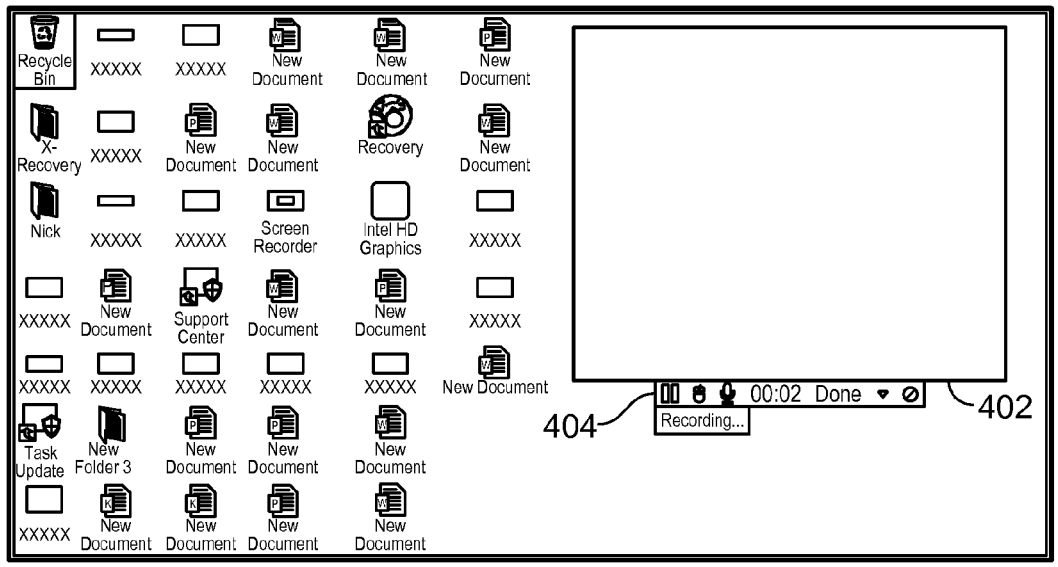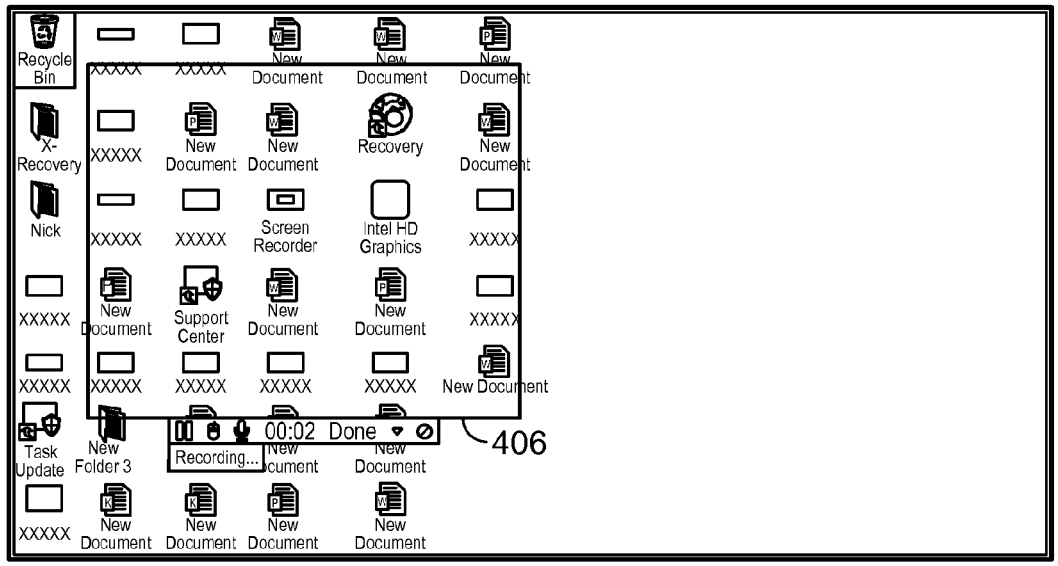
FIG. 4

| Browse | Upload | ⦿ Record | | | 🖐(149) ⚙▾ 👤 Nick Stokman▾ |

🍎⭐ﾠﾠﾠHow to...ﾠﾠﾠ🔍 add filter

Edit Users ﾠ New User Time Zone ﾠ Change Color ﾠ Change Logo ﾠ Statistics

Check a Search Team

Total Searches
492 searches ever, with 18 searches in the last seven days and 89 in the last thirty days

| Blackboard | Go |

○Day ○7 days ○30 days ○Year ○Forever
Please enter a search term to check.

What People are NOT Finding

- Blackboard (300 results)
  - How to check my grades on Blackboard
  - How to use Blackboard to setup advisor meeting
  - How to find my syllabus on Blackboard
  - How to download documents from Blackboard
  - How to check printing balance on Blackboard
  - How to send mass email on Blackboard
  - How to view grades on clicker quizzes on Blackboard
+ Transcript (213 results)
+ Printing (47 results)
+ Grades (32 results)
+ Syllabus (19 results)
+ Meeting (8 results)

Most Popular: Last 7 Days

1 : "test" has been used 8 times.
▬▬▬▬▬

2 : "virtual" has been used 5 times.
▬▬▬

3 : "machine" has been used 5 times.
▬▬▬

4 : "vm" has been used 3 times.
▬▬

5 : "text" has been used 1 time.
▬

*FIG. 6*

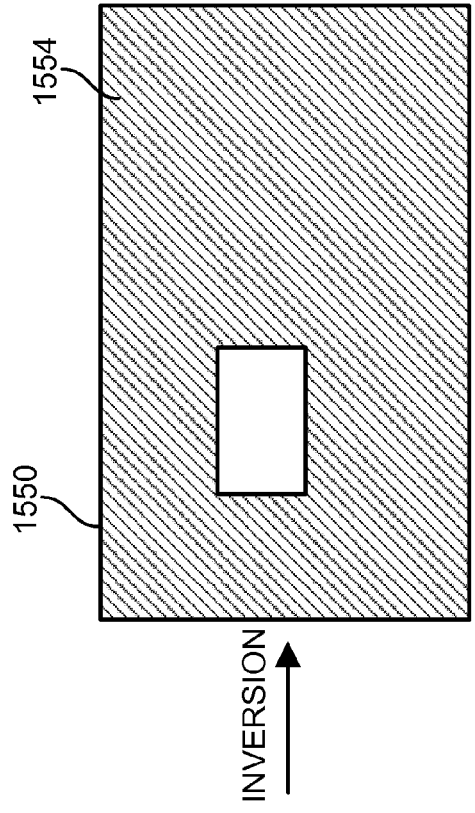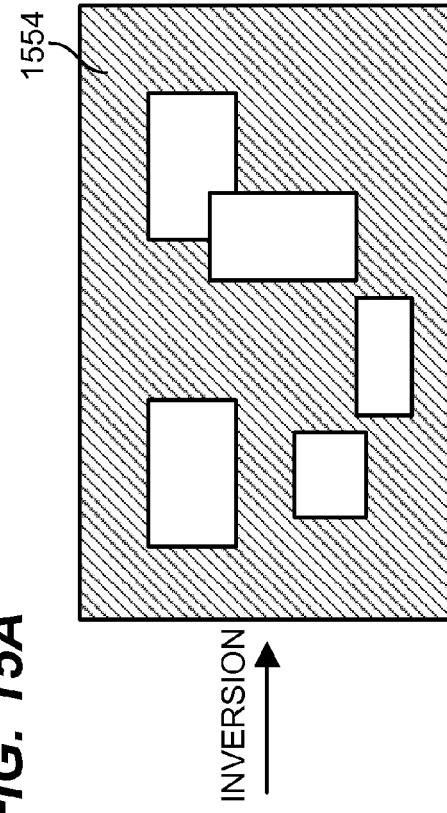
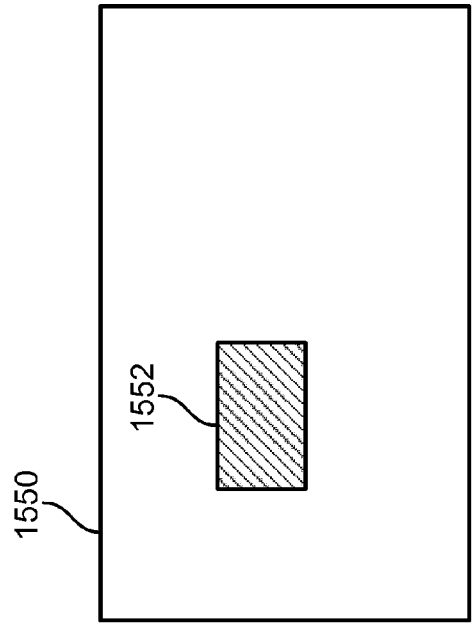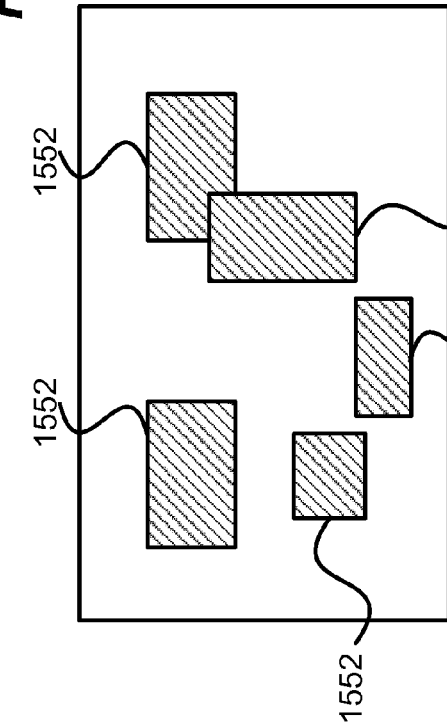
FIG. 15A
FIG. 15B

EASY-TO-USE DESKTOP SCREEN RECORDING APPLICATION

CLAIM OF PRIORITY AND CROSS-REFERENCE TO RELATED PATENT APPLICATIONS

This patent application claims the benefit of priority to U.S. Patent Application Ser. No. 61/943,745, filed on Feb. 24, 2014; entitled "EASY-TO-USE DESKTOP SCREEN RECORDING APPLICATION," and claims the benefit of priority to U.S. Patent Application Ser. No. 62/060,394, filed on Oct. 6, 2014; entitled "EASY-TO-USE DESKTOP SCREEN RECORDING APPLICATION," each of which is hereby incorporated by reference herein in their entireties.

BACKGROUND

Most organizations have computer-based procedures or processes that are used by its members. For example, an employer may have time-sheet entry and purchase order submission, and a college may have class registration. To train members of an organization to use these computer-based procedures, many organizations create and publish "how-to" videos that explain the computer-based procedures to the viewer. However, creating and publishing these videos often requires the organization to perform a number of logistical tasks, such as installing a licensed copy of the recording software on a computer, editing the recorded video (probably on another computer and using a separate video editing application), transcoding the edited video, storing the transcoded video on a file server, publishing the stored video on the organization's intranet, and maintaining the videos and the infrastructure supporting the videos. These tasks may require multiple people or departments within the organization to be involved, may be costly, may be complicated, and may take a long time to complete. Furthermore, a successful search for a relevant video often depends upon the video's title and/or the location of the video on the organization's intranet.

BRIEF DESCRIPTION OF THE DRAWINGS

In the drawings, which are not necessarily drawn to scale, similar numerals may describe similar components in different views. Like numerals having different letter suffixes may represent different instances of similar components. Various embodiments are illustrated by way of example, and not limitation, in the figures of the accompanying drawings, in which:

FIG. 4 illustrates repositioning the recording area during a pause in recording, in accordance with various embodiments;

FIG. 6 illustrates an analytics report on user searches within the application, in accordance with various embodiments;

FIG. 15A illustrates bounding region inversion, in accordance with some embodiments;

FIG. 15B illustrates inverting multiple bounding regions, in accordance with some embodiments;

DETAILED DESCRIPTION

Figure 1:
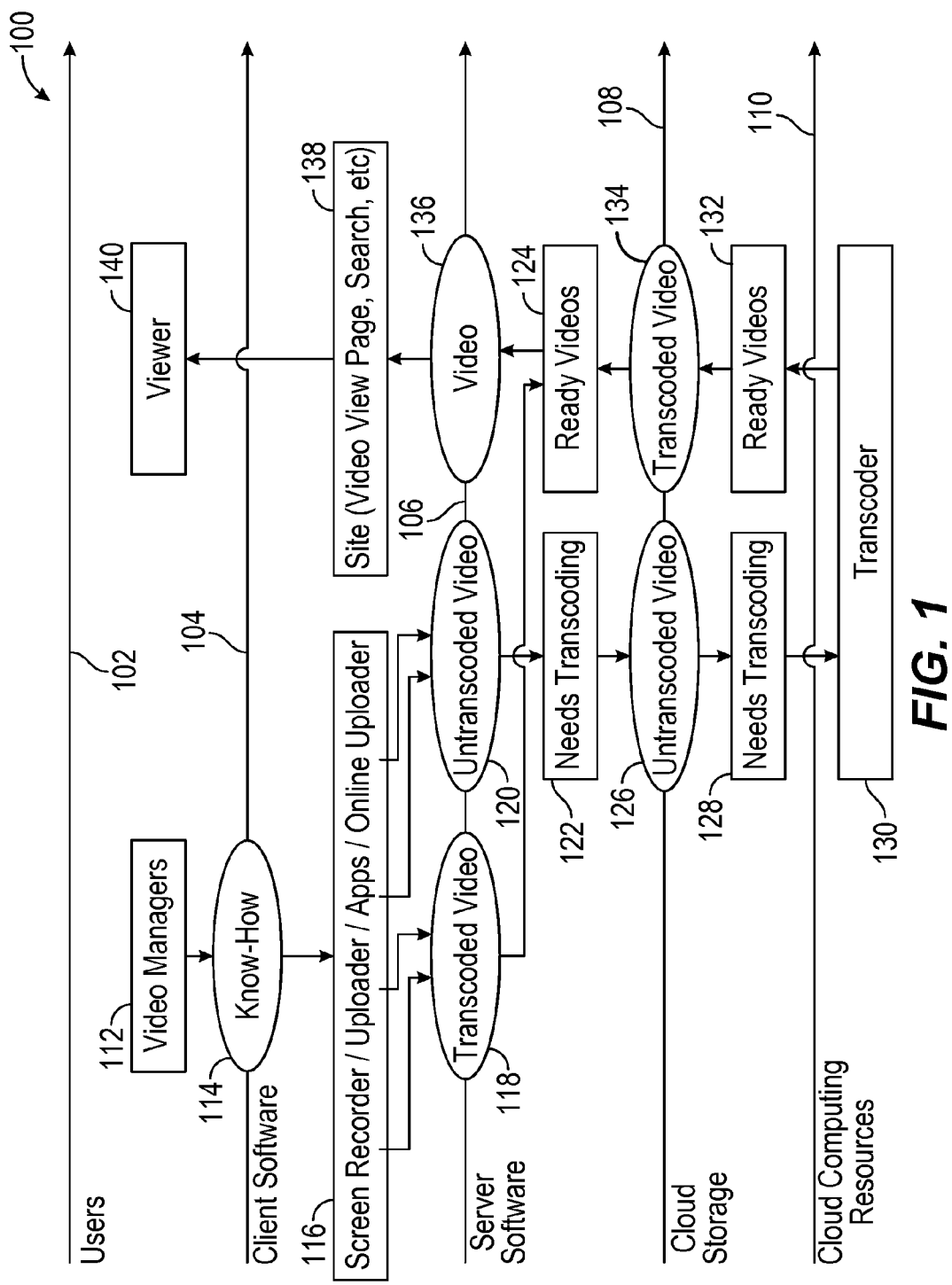
FIG. 1 is a flowchart illustrating data flow within a system for desktop screen recording, in accordance with various embodiments.

The following description and the drawings illustrate specific embodiments to enable those skilled in the art to practice them. Other embodiments may incorporate structural, logical, electrical, process, and other changes. Portions and features of various embodiments may be included in, or substituted for, those of other embodiments. Embodiments set forth in the claims encompass all available equivalents of those claims.

In various embodiments, a web-based learning platform integrates content (e.g., video) creation, content retrieval, and content management into a single interface, allowing content creators to teach content viewers how to perform computer-based procedures, typically within an organization. In various embodiments, an easy to use screen recorder allows users within an organization to create video recordings/tutorials. Using the web-based learning platform, an organization can build its own "how-to" database of tutorials for organization-specific systems, processes, and applications. The platform includes a cloud-based database that allows viewers of an organization's authorized content to search for content, and a search engine that allows users to search for content semantically. The platform facilitates the effectiveness of the video search engine by using vocabulary or acronyms customized to the organization's industry.

For example, a corporation using the learning platform could quickly create the following video tutorials: how to submit a request for software, how to navigate an enterprise resource planning ("ERP") module, how to report errors in a software release, how to setup direct deposit of paychecks, how to submit an expense report, how to log paid-time-off ("PTO"), how to log hours, etc. When a content viewer has a question, the content viewer can search for these video tutorials. For instance, a newly hired employee may search "how to make a software request" when approached by a manager about a new software rollout. Instead of needing to find experienced employees and consume their time, the new hire can search for "how to upgrade software" and the learning platform will return a link to the tutorial "how to make a software request." By using the learning platform, the organization saves time in its daily business operations. Instead of asking managers or experienced employees to demonstrate simple processes, newly hired employees can quickly find a video demonstration of the process. The learning platform not only makes employees more productive by allowing them to find the answers to their questions when they need them, but it also saves time for managers and support departments, who no longer have to answer many simple and/or repetitive questions.

In addition to training new hires, the learning platform can also benefit experienced employees by providing a resource to remind experienced employees how to perform processes that are infrequently performed, and are therefore, hard to remember, such as "how to fill out an expense report" or "how to submit an expense report."

In addition to other areas, the following organizations would particularly benefit from using the learning platform: universities, schools, corporations, and organizations with high learning needs, high turnover, complex software, or complex organizational processes.

FIG. 1 is a flowchart illustrating data flow 100 within a system for desktop screen recording, in accordance with various embodiments. A system for desktop screen recording includes users 102, client software 104, server software 106, cloud storage 108, and cloud computing resources 110.

Server 106 is a computer or a set of computers that host the web-based application, host video files, and store user information and video data in a video database. The term "web-based application" includes applications that are provided over HTTP-based networks, such as a single-location company intranet, a multi-location company intranet, or even the World Wide Web. In various embodiments, server 106 is hosted as one or more virtual machines on a cloud-computing provider, such as Amazon's hosting service (EC2).

A video manager 112 is a user 102 who is authorized to make or upload content, such as videos or screen recordings. Video managers 112 generally have technical expertise 114 (i.e., knowledge or "know-how") with the process that they are capturing on video. Video managers 112 generate recordings 116 to share their technical expertise with others. Video managers may share knowledge via screen recordings, pre-recorded content uploaded using an "Upload Manager" program, or mobile apps that allow uploading of content.

In various embodiments, transcoding content involves converting content to a different format of similar or like quality, usually to gain compatibility with another program or application. In various embodiments, transcoding refers to a two-step process in which the original data/file is decoded to an intermediate format (e.g., PCM for audio or YUV for video), which is then encoded into the target format (e.g., MP4).

Content recorded using the recorder provided by the web-based application 104 or uploaded using the "Upload Manager" program will have already been transcoded locally on the user's computer, and therefore do not require additional transcoding; after being uploaded to server 106, these transcoded videos 118 are considered "ready videos" 124 because they are ready to be made available for viewing. Server 106 saves ready video 124 as video 136 and provides video 136 to web site 138. Web site 138 makes video 136 available to authorized viewers 140.

Content loaded from other sources, such as a mobile app or an upload tool on the web site, is not yet transcoded; these untranscoded videos 120 need to be transcoded before they are made available for viewing. Server 106 makes available 122 untranscoded video 120 to a cloud storage provider 108, such as Amazon S3. The cloud storage provider 108 makes available 128 untranscoded video 120 to cloud computing service 110, which transcodes 130 the video. Cloud computing service 110 then makes available 132 to cloud storage provider 108 the transcoded video 134. The cloud storage provider 108 then makes available to server 106 the transcoded video 134 as ready video 124. Finally, server 106 saves ready video 124 as video 136 and provides video 136 to web site 138. Web site 138 makes video 136 available to authorized viewers 140.

Features

Automatic Redirect

In various embodiments, when recording is in progress and the "Automatic Redirect" feature is enabled, clicking the "DONE" button or hyperlink stops the recorder, begins transcoding the video on the local computer, uploads the transcoded video to the database, and directs the browser tab that is running the recorder to a web page where the video can be reviewed, titled, given tags, or put into a playlist. After clicking the "DONE" button or hyperlink, the video is immediately available in the database for searching.

Text Outline Integration

Figure 2:
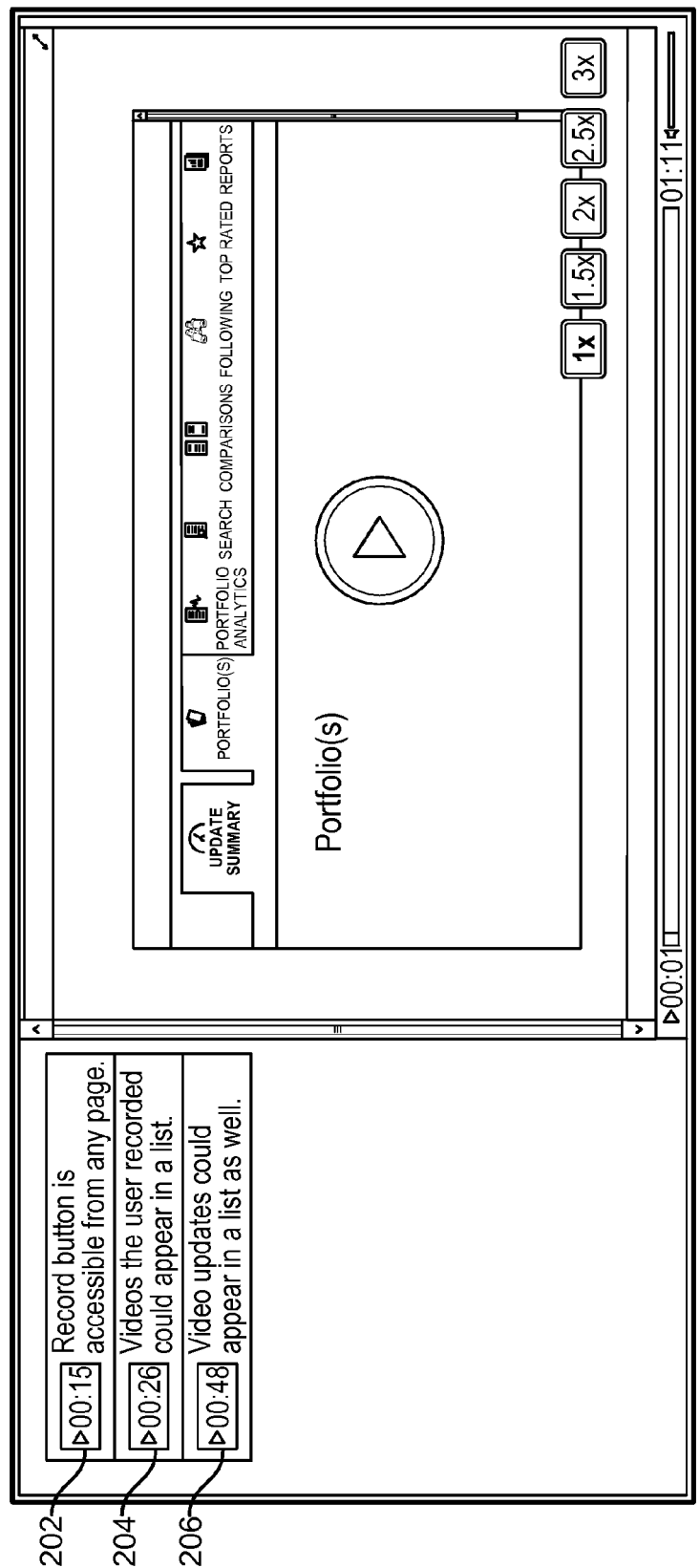
FIG. 2 illustrates a recorded video integrated with a text outline, in accordance with various embodiments.

FIG. 2 illustrates a recorded video integrated with a text outline, in accordance with various embodiments. In various embodiments, Text Outline Integration allows content creators to give a short list of text-based instructions 202, 204, 206 next to the video, allowing viewers of the video to review the short list of text-based instructions 202, 204, 206 of the video in written form. If the viewer needs a visual demonstration of a certain text-based instruction 202, 204, 206 in the outline, the viewer can click the time stamp corresponding to the text-based instruction 202, 204, 206 and the video starts playing at that particular point.

Simple Screen Recorder

Figure 3:
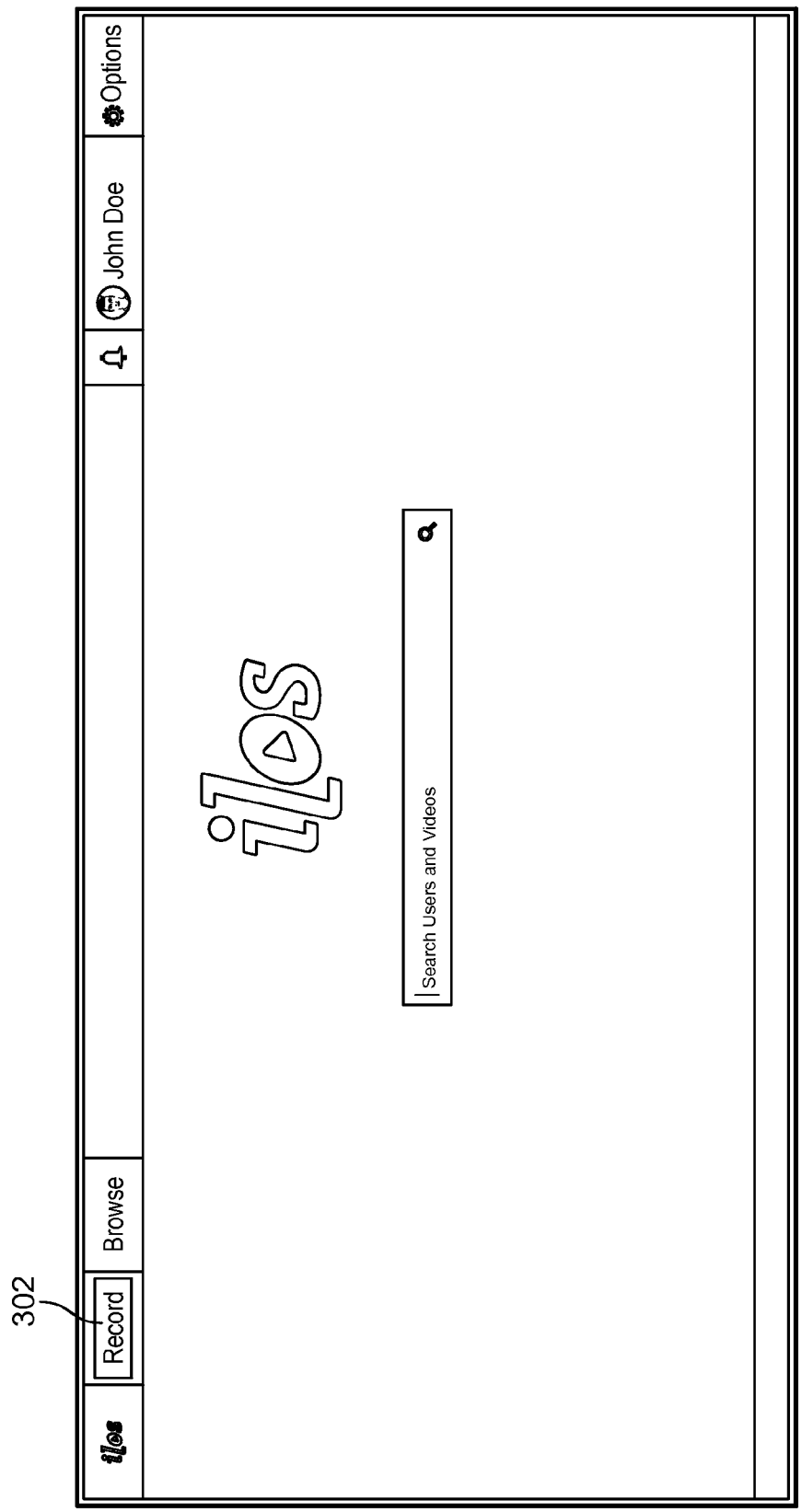
FIG. 3 illustrates a screen recorder with a simple screen recording mechanism, in accordance with various embodiments.

FIG. 3 illustrates a screen recorder with a simple screen recording mechanism, in accordance with various embodiments. In various embodiments, the Record button 302 is present in the top navigation bar of the website, allowing the Screen Recorder to be launched from anywhere in the website. In various embodiments, the Screen Recorder is web-based. In various embodiments, the Screen Recorder may be a standalone application. In various embodiments, launching the application is similar to pressing "create" to compose an email in various web-based email applications; however, instead of opening a blank email, clicking "Record" 302 launches a screen recorder.

Recording Multiple Videos

In various embodiments, settings can be set to allow multiple videos to be recorded, one after another, without the Automatic Redirect function enabled. This allows a user to create in a row as many videos as the user wants and postpone the editing, titling, and other video management functions for later. With this setting, a user is able to click "Done" after recording, and while the video is transcoding, create the next video without interruption by just pressing record again.

Keyboard Button(s) to Record

In various embodiments, a setting may allow a user to record by holding down a keyboard button, such as the Caps Lock button. In various embodiments, the setting may allow the user to record by holding down a combination of keyboard buttons, such as Caps Lock and a Shift key. In various embodiments, a setting can allow a user to pause recording by lifting up the keyboard button(s) held down for recording. In various embodiments where multiple keyboard buttons must be pressed for recording to begin, a subset of the keyboard buttons may be released without causing the recording to pause. For example, if the button combination Caps Lock and Shift is set to start the recording, the recording will only stop upon the release of the Caps Lock button; the Shift button may be released without stopping the recording. In various embodiments, recording begins again when the user holds down the keyboard button(s) again, and pauses upon releasing the keyboard button(s). In various embodiments, the video recording does not complete until the user clicks "Done."

In various embodiments, when the recorder is active, pressing the specified keyboard button(s), such as Caps Lock, will serve only to affect the recorder and will not activate the normal functionality of the specified keyboard button(s). For example, if the Caps Lock button is set as the keyboard button to control recording, when the recorder is active, pressing down on the Caps Lock button does not toggle capital letters on or off on the user's computer. When the recorder is not active, Caps Lock functionality returns to the Caps Lock button.

An alternative method of implementing hold to record functionality is to monitor a key and automatically undo the action that was taken. For example, when the Caps Lock button is pressed, Caps Lock mode is toggled, but as soon as the Caps Lock button is released, the screen recorder resets the state of Caps Lock mode. If Caps Lock mode was OFF before the user pressed the Caps Lock button, the operating system will turn Caps Lock mode ON as soon as the Caps Lock button is pressed. When the Caps Lock button is released, the screen recorder resets Caps Lock mode to OFF.

Reposition Recording Area During Pause

FIG. 4 illustrates repositioning the recording area during a pause in recording, in accordance with various embodiments. In various embodiments, while the screen recorder is paused, the screen recorder can be repositioned on the screen to record specific areas of the screen, rather than the whole screen. For example, at time A, the screen recorder is recording an area of the screen indicated by rectangle 402. At time B, after the screen recorder has been paused, for example by a user selecting the pause button 404, the area of the screen to be recorded by the screen recorder can be repositioned, such as the area of the screen indicated by rectangle 406. Upon resuming recording, the area of the screen captured will be the new area 406.

Title Video

In various embodiments, a recorded video may be titled using the screen recorder interface, such as a text box. The video may be titled before or after the video is recorded.

Alternate Border States

Figure 5:
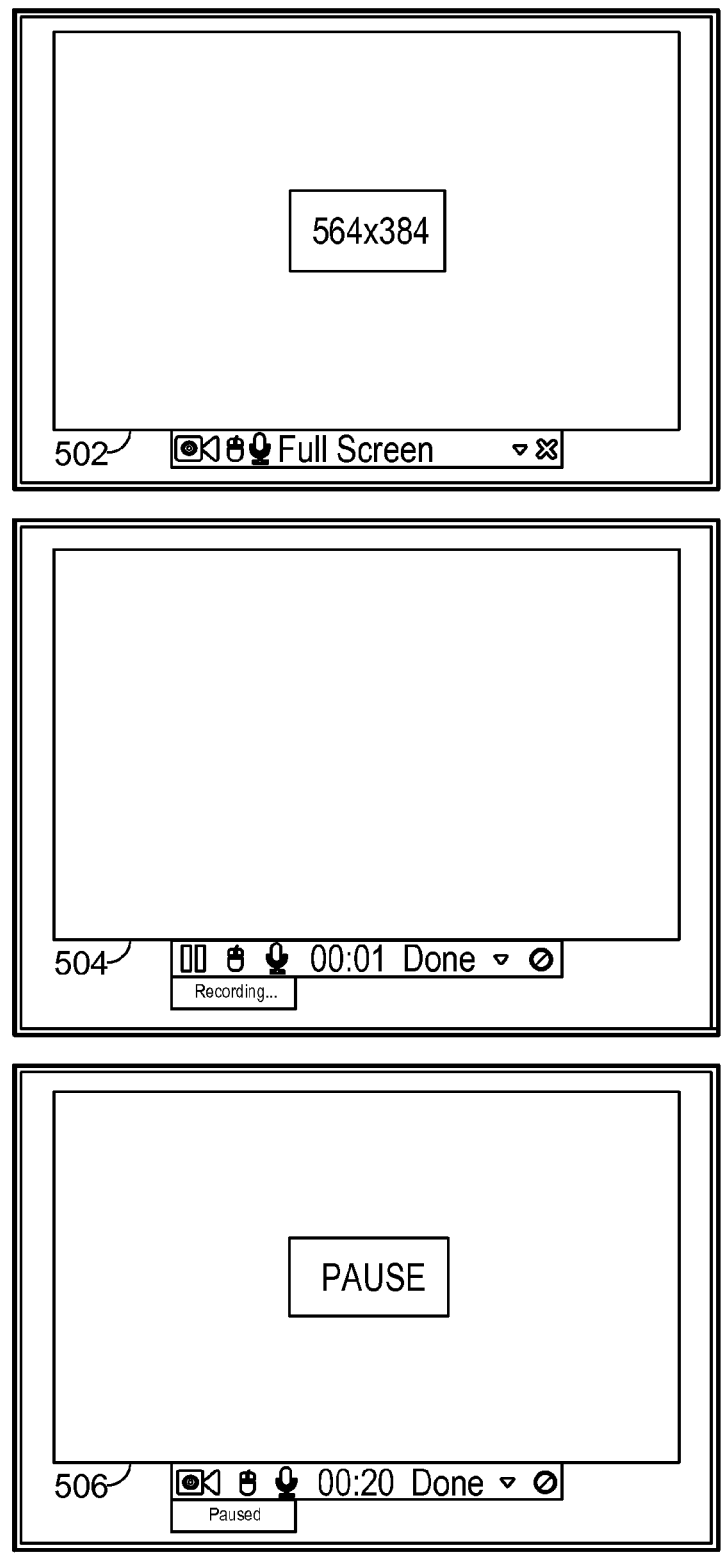
FIG. 5 illustrates three alternate borders of a screen recorder denoting three alternate states of the screen recorder, in accordance with various embodiments.

FIG. 5 illustrates three alternate borders of a screen recorder denoting three alternate states of the screen recorder, in accordance with various embodiments. If the screen recorder is configured to use a key command to record, the border of the recording area blinks when the configured key is held down to record. The blinking occurs at a high rate of frequency and to help the user remember that recording is in progress. Upon release of the configured key, the border of the recording area stops blinking.

In various embodiments, the borders of the screen recorder may vary based on the current status of the screen recorder. For example, the border may be grey 502 by default, red 504 while recording, and blue 506 while recording is paused.

Permission Levels

In various embodiments, the web-based application gives content owners the ability to set permission levels for each user. In various embodiments, possible permission levels include:

Administrators have full access to all application features, including permissions to change the company logo, the color of the interface, and perform database management;

Managers have permission to create and manage videos and playlists; and

Viewers have permission only to view videos.

In addition, permissions can be applied to individual playlists.

Upload Manager

In various embodiments, an upload manager program allows users to drag and drop existing video content into the web-based application. Unlike other web applications that transcode content, once a video is uploaded to the server, the upload manager transcodes the video locally, thus making transfers of large video files from the user's computer to the server much faster than when using other web applications.

In various embodiments, the upload manager program allows users to upload any type of video from their computer. The user can retitle a video using the upload manager program without changing the file name of the local copy of the video.

Analytics

FIG. 6 illustrates an analytics report on user searches within the application, in accordance with various embodiments. In various embodiments, the analytics feature produces reports on two categories of search queries: What people are probably not finding ("automated tracking"), and what people are NOT finding ("flagged searches").

When a user submits a search query and no results are returned, the search query is flagged and the search query is added to a list of search queries that return no results (e.g., "no result searches"). When a user submits a search query and the search produces results, but the user does not click on any of the results, the system adds the search query to a list of search queries that are likely not being found. In both instances—whether a search query yields results or not—the user has the option to flag the search query as not yielding the correct result, thus adding the search query to the list of things not being found.

These two lists, automated tracking and flagged searches, allow the content owners to separate queries of potentially higher priority—queries returning no results—from queries of potentially lower priority—queries returning irrelevant results.

In various embodiments, the analytics feature uses algorithms to analyze searched words and intuitively show content owners a top-level view of the specific videos, for which users are searching but not finding. For example, if a user searches for something but never selects a search result, or if the search query returns no search results, the user most likely did not find what he/she was seeking.

For example, if a user searches for "how to submit an expense report," receives search results, but does not click on any of the videos that appear in the search results, the user's search query is added to a list of "what people probably are not finding." Users also can click the "didn't find what I'm looking for button" after running a search query, thereby adding their search query to "what people are not finding". If a search query returns no search results, that search query is automatically added to a list of "what people are not finding". Other criteria used may include user time spent on a video after a query, sequence of videos selected, ratings of videos selected, analyzing user action and behavior after a query, etc.

To display information effectively, the application searches all listed items, regardless of whether a user runs a search query that concludes in a list like "what people are not finding". Each word from these search queries is then ordered in the list according to frequency. For instance, in FIG. 6, the most commonly searched term was "Blackboard" (it was searched for 300 times). Selecting the plus icon to the left of the term "Blackboard" displays a list of all the searches that contained the term "Blackboard," but which did not successfully find what the user was seeking.

Organizing Content Using Playlists

In various embodiments, content can be organized by playlists. Permissions can also be applied to each individual playlist, allowing Video Managers to authorize users to view and/or edit videos within a particular playlist.

Searching Content by Filtering

Figure 14:
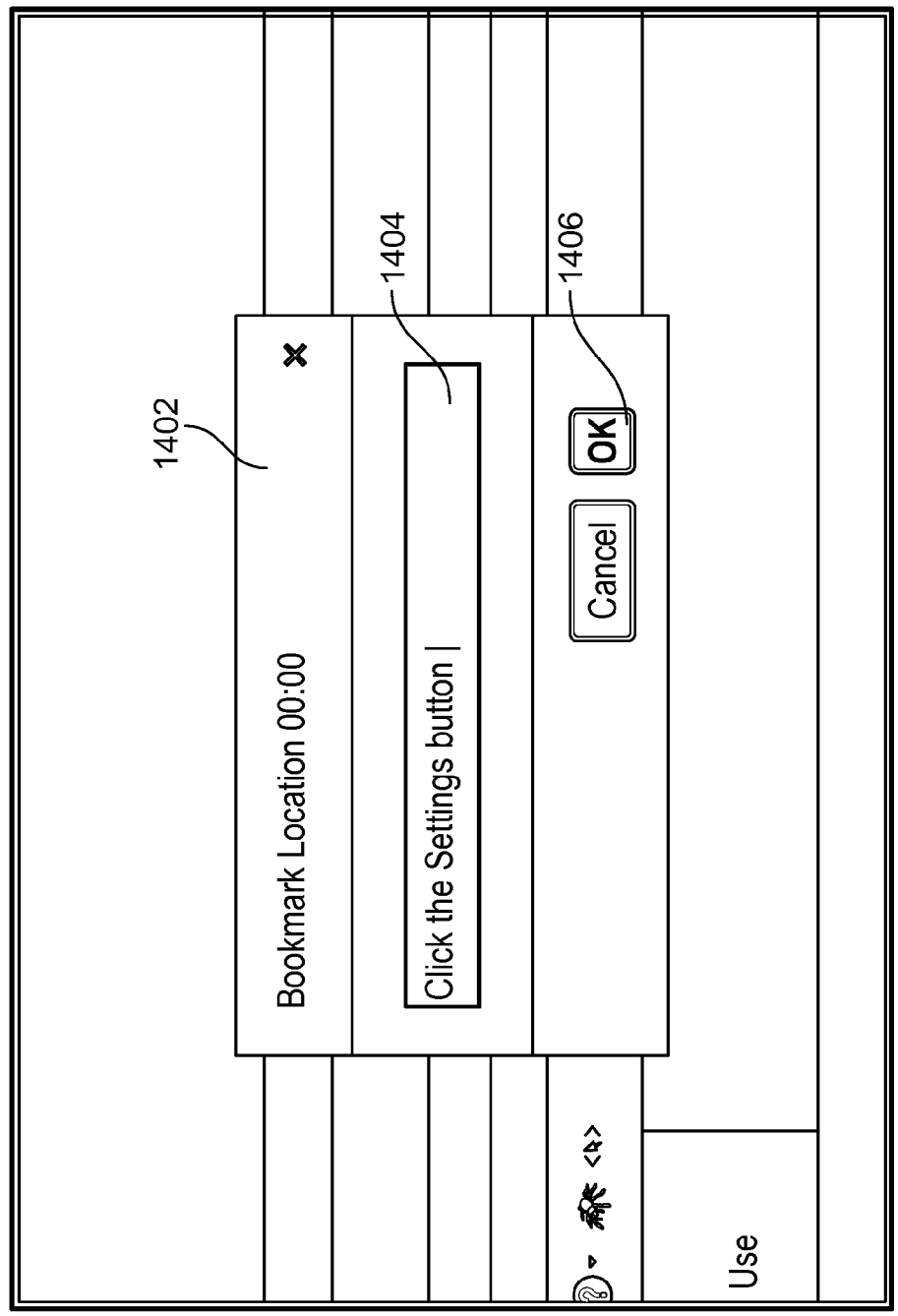
FIG. 14 illustrates a companion text/bookmark feature, in accordance with various embodiments.

FIG. 14 illustrates searching for content by filtering within the web-based application, in accordance with various embodiments. From the aggregate video view or search results screen, a viewer can filter items by the user that created the content, the specific playlist that contains content, by the time/date the content was created, by department, by location, or the like.

Content Privacy Settings

Viewing permissions for a video are broken down into two categories: those who can search for the video, and those who can view the link to the video. In the first category, a user can set the video to be searchable by no one, by users within a specific group, or by everyone in their organization. In the second category, "who can view the link to this video," the user can set a link to a video of the user to be viewable by only the user, by users within a specific group(s), everyone in the user's organization, or everyone. When a video link's permission is set to be viewable by everyone, anyone can view the video (assuming the viewer has access to the link).

Flagging Content

In various embodiments, a video can be flagged as being inappropriate, inaccurate, outdated, etc., by selecting an icon (e.g., a flag) associated with the video. In various embodiments, a number of preset flagging options exist, with an "Other reason . . . " option for viewers to use when none of the preset flagging options applies.

Save a Local Copy of a Video

In various embodiments, the web-application allows a user to save to the local computer a copy of the video that is currently active in the screen recorder. In various embodiments, videos are saved to the cloud by default, although a user can also choose to save files manually or automatically to the user's local computer.

Count-Down Timer

Figure 7:
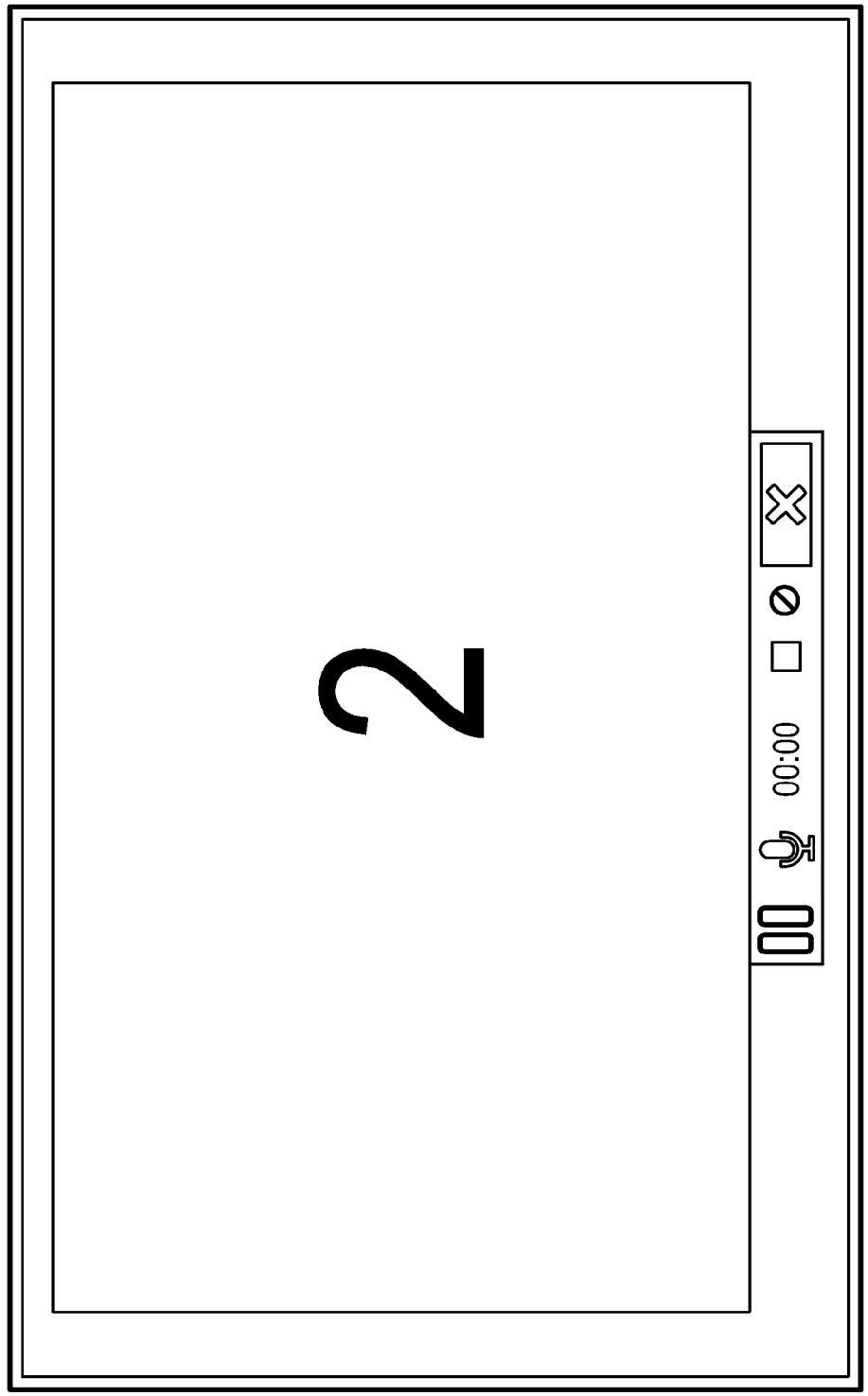
FIG. 7 illustrates a count-down timer within the screen recorder, in accordance with various embodiments.

FIG. 7 illustrates a countdown timer within the screen recorder, in accordance with various embodiments. In various embodiments, the screen recorder counts down (e.g., counts backwards) from a configured number of seconds (e.g., three) before recording begins. In various embodiments, the time remaining before recording begins is displayed on the screen. This feature can be turned off to allow for video recording to begin instantaneously.

Text Outline Search

Figure 8:
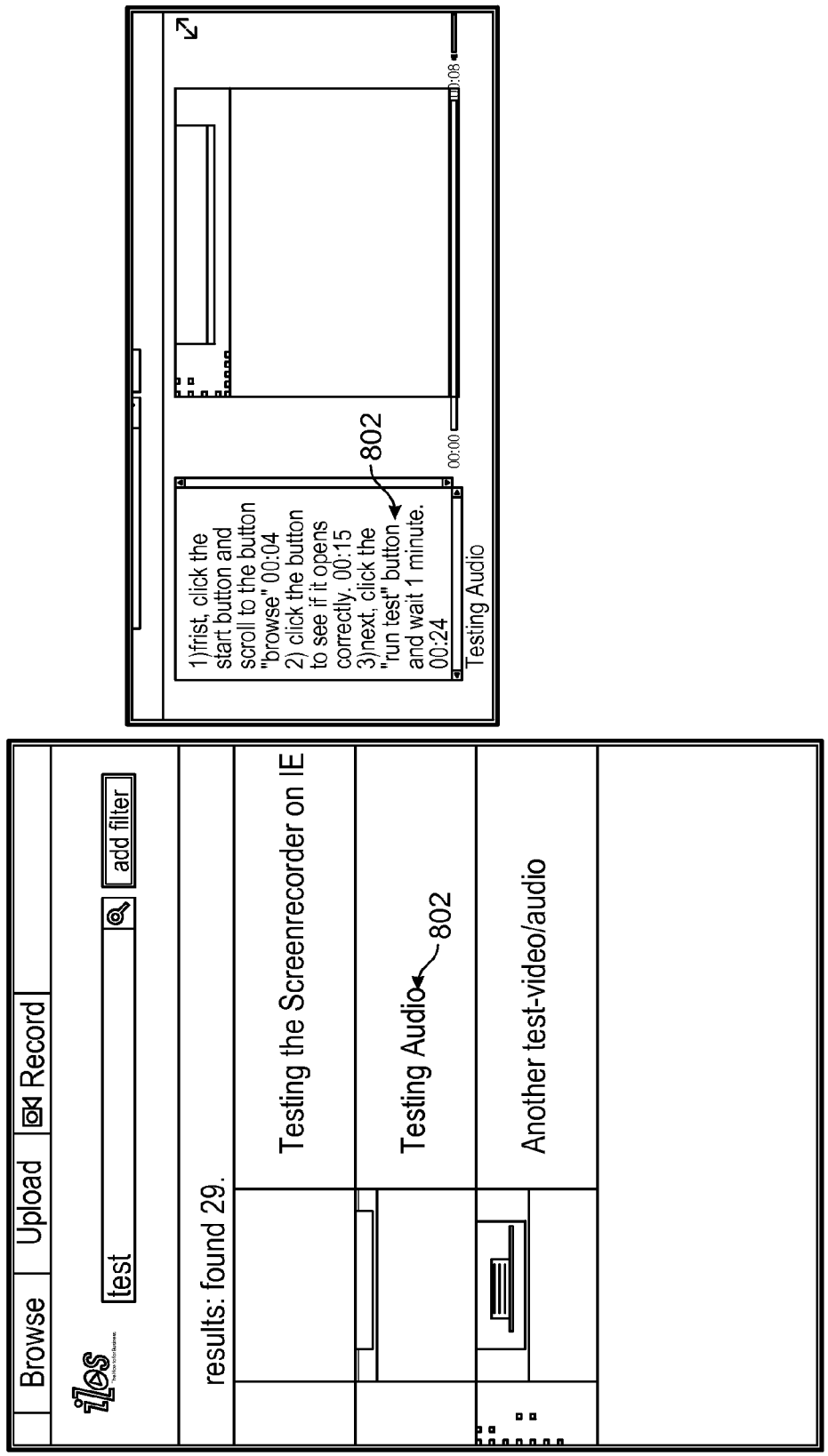
FIG. 8 illustrates search results containing links to videos whose text outlines contain the searched for terms, in accordance with various embodiments.

FIG. 8 illustrates search results containing links to videos whose text outlines contain the searched for terms, in accordance with various embodiments. This feature builds upon the traditional search query result, in which the results of a search query are relevant to the searched for terms, but takes things a step further. When a user clicks through to one of the resulting videos in a search query result, the web-based application will automatically search the text outline of the video for the same search terms used in the search query. This allows users to identify points in the video that are specifically relevant to the terms used in the search query; the user can then start playback of the video at a relevant point within the video by clicking the time stamp associated with the relevant search term(s).

Collaborative Video Editing

Figure 9:
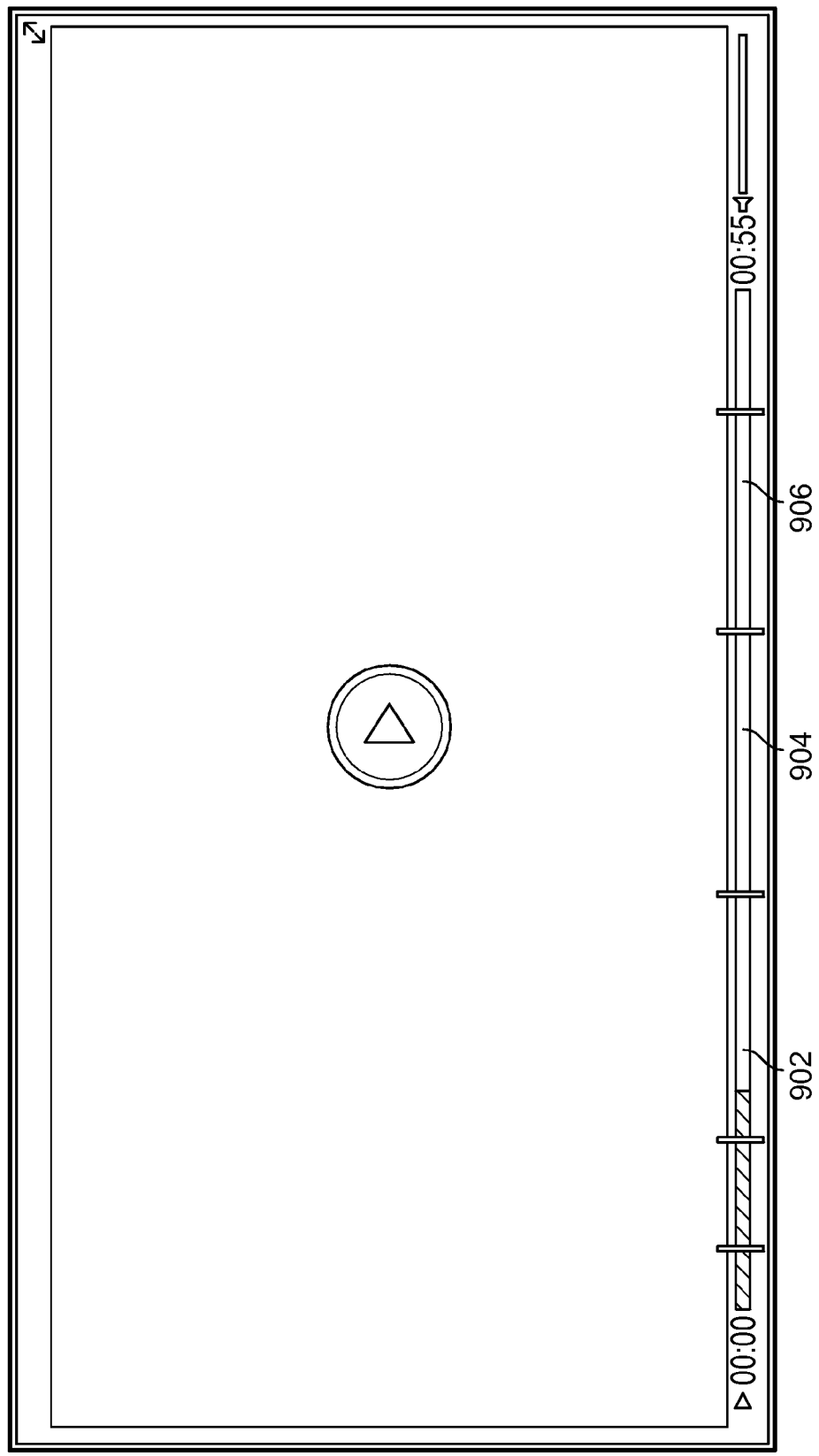
FIG. 9 illustrates collaborative video editing amongst a plurality of users, in accordance with various embodiments.

FIG. 9 illustrates collaborative video editing amongst a plurality of users, in accordance with various embodiments. Collaborative video editing gives video managers the ability to assign different sections of a video project to different users and gives a user with the appropriate permissions the ability to blur video content or insert annotations into the section(s) of the video assigned to the user. FIG. 9 shows a screen shot of a video breakdown that could represent a video giving tips on deciding which classes to take, in which the different sections could be assigned to different users as follows:

SECTION 902: Setup meeting with your advisor for guidance—Assigned to User 1.

SECTION 904: Browse the available classes—Assigned to User 2.

SECTION 906: Search ratings on a professor ratings website for the professors of classes in which you are interested—Assigned to User 3.

Each section of a video can be assigned to a user, until all sections of the video have been assigned.

Re-record over specific sections/Splice in existing video

Figure 10:
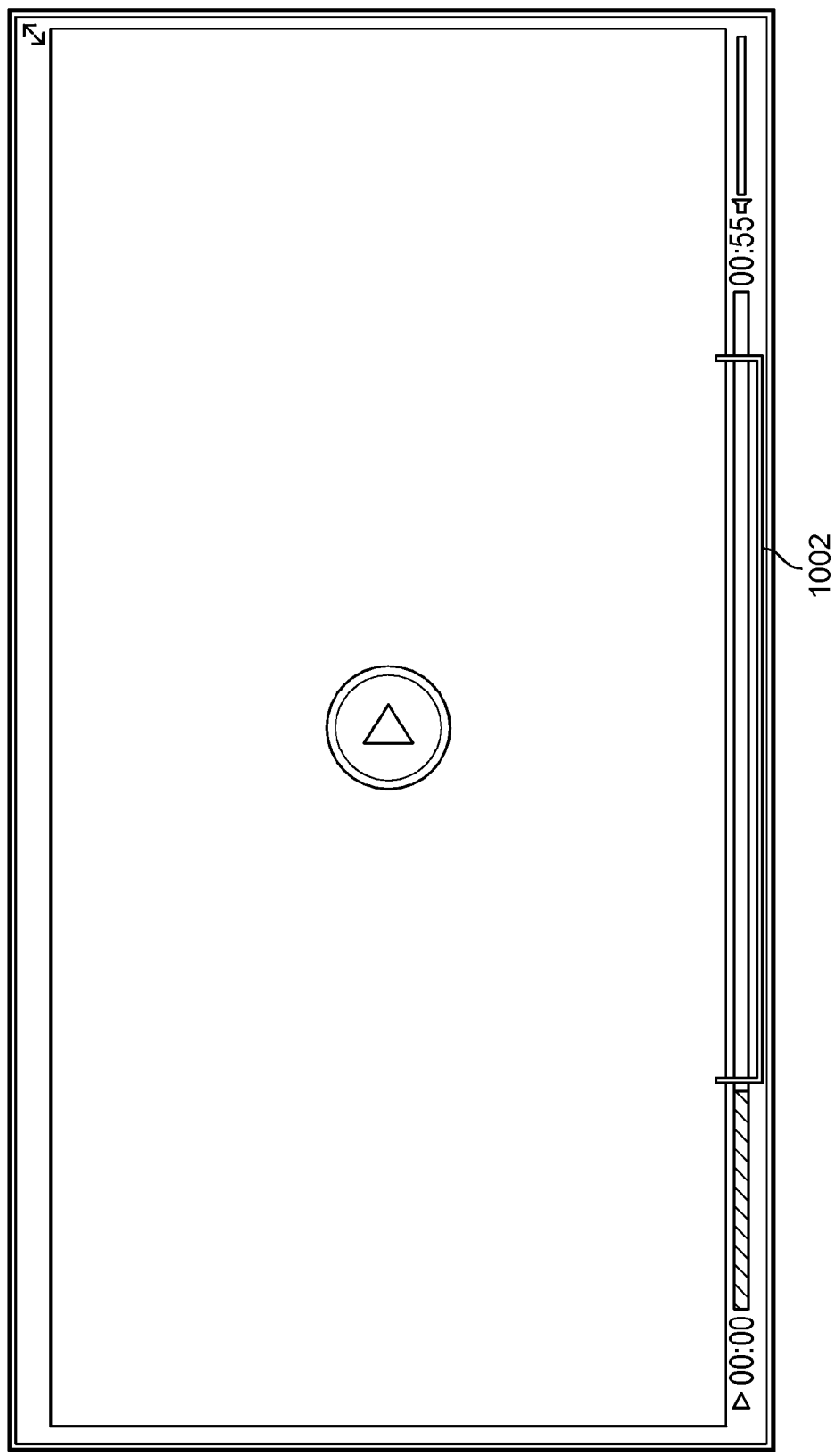
FIG. 10 illustrates replacing sections of a recorded video, in accordance with various embodiments.

FIG. 10 illustrates replacing sections of a recorded video, in accordance with various embodiments. This feature allows a user to record over specific video sections, with which they were not satisfied, or to splice-in existing video content, such as from the video database. For example, FIG. 10 shows a video section 1002 that has been selected for replacement.

Associating Input Events to Timestamps

Figure 11:
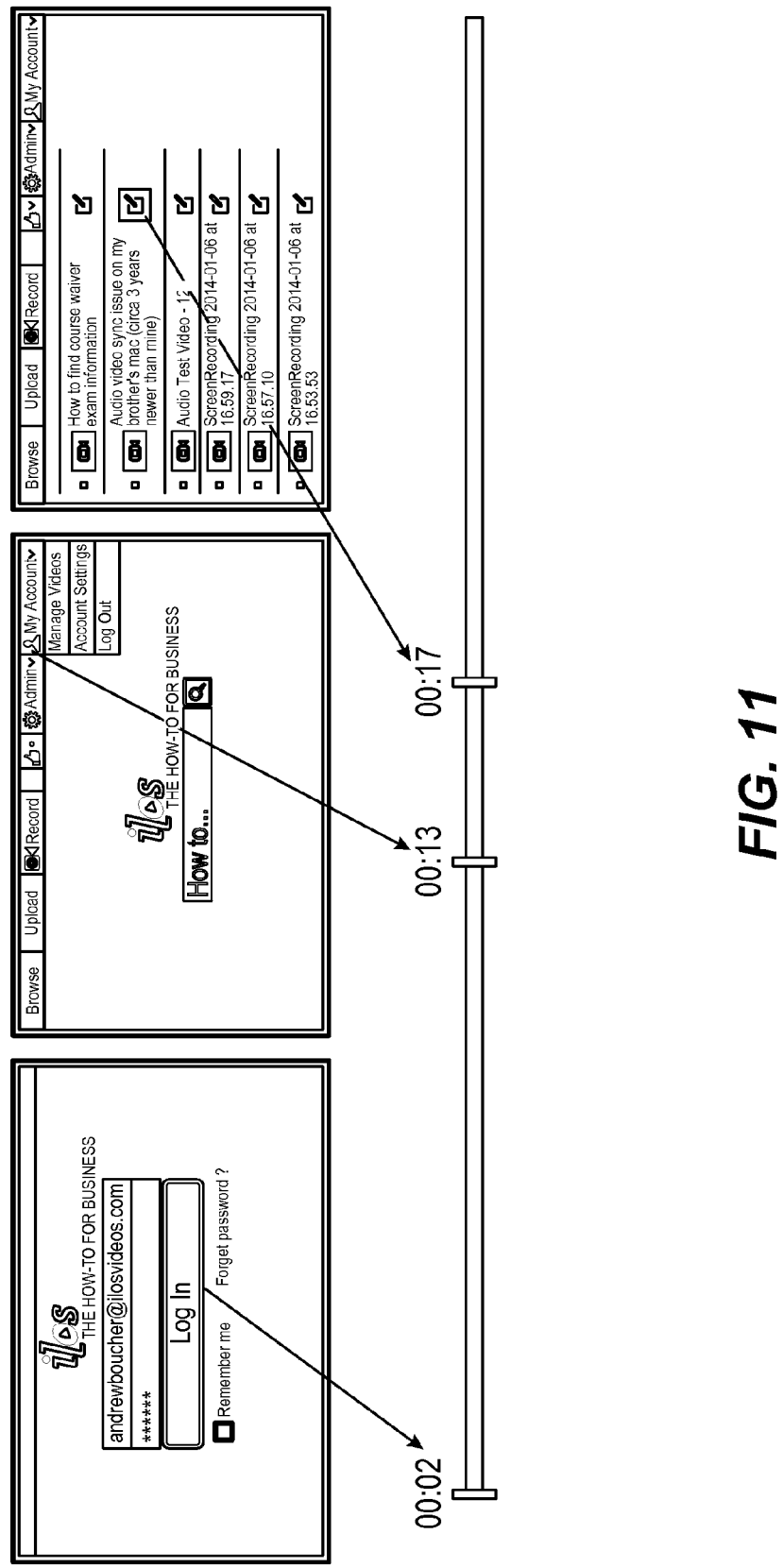
FIG. 11 illustrates associating input events within a video to timestamps, in accordance with various embodiments.

FIG. 11 illustrates associating input events within a video to timestamps, in accordance with various embodiments. During a video recording, the screen recorder constantly monitors the keyboard and mouse for activity. When a content creator clicks a button on their mouse, scrolls using the mouse, or clicks a button on their keyboard, a function is executed in the screen recorder. The function records an "event" that consists of the elapsed time since the start of the video recording and the relevant information regarding the event, such as the cause of the event (e.g. button press, button release, coordinates of the cursor/pointer on the screen, etc.). This list of events is uploaded to the server along with the recorded video. The server uses the event timestamps uploaded with the recorded video to extract a screenshot image of each frame where an event occurs. Each of the extracted images thus represents a point in the recorded process where the content creator engaged in a relevant step of the process.

Use Cases

Slideshow

A user can access the extracted images as a slide show of the relevant steps of the recorded process. This slideshow can be made available as supplementary material to the recorded video of the process.

Playback

Figure 12:
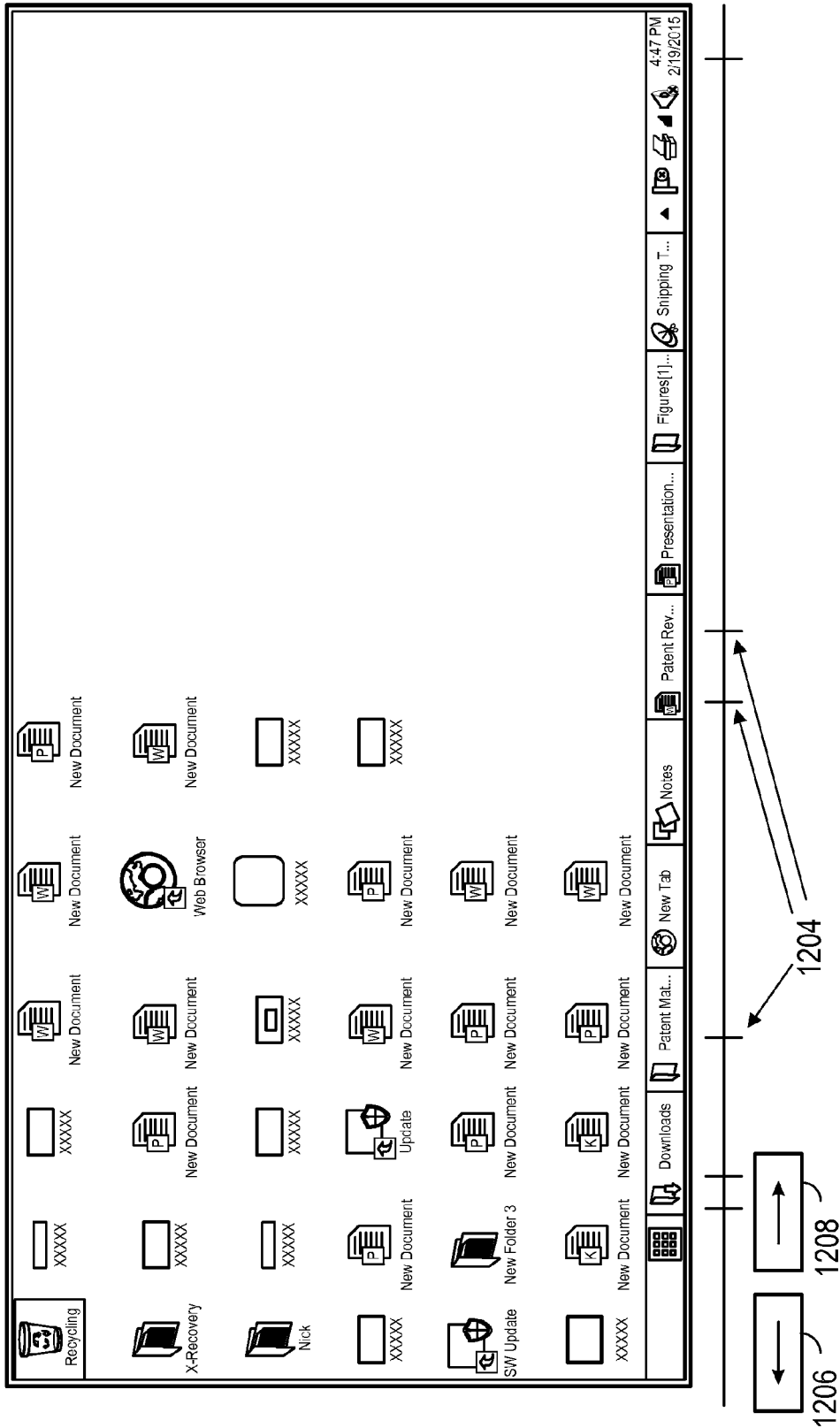
FIG. 12 illustrates using timestamps captured during "user events" to create bookmarks in a video, in accordance with various embodiments.

FIG. 12 illustrates using timestamps captured during "user events" to create bookmarks in a video, in accordance with various embodiments. Using such timestamps, a user can easily and quickly skip to different parts of a video and view the associated process steps taught in the video. Screenshot images extracted from the video at these timestamps can be shown as thumbnails to assist the user in finding a specific event within the video.

Editing

Figure 13:
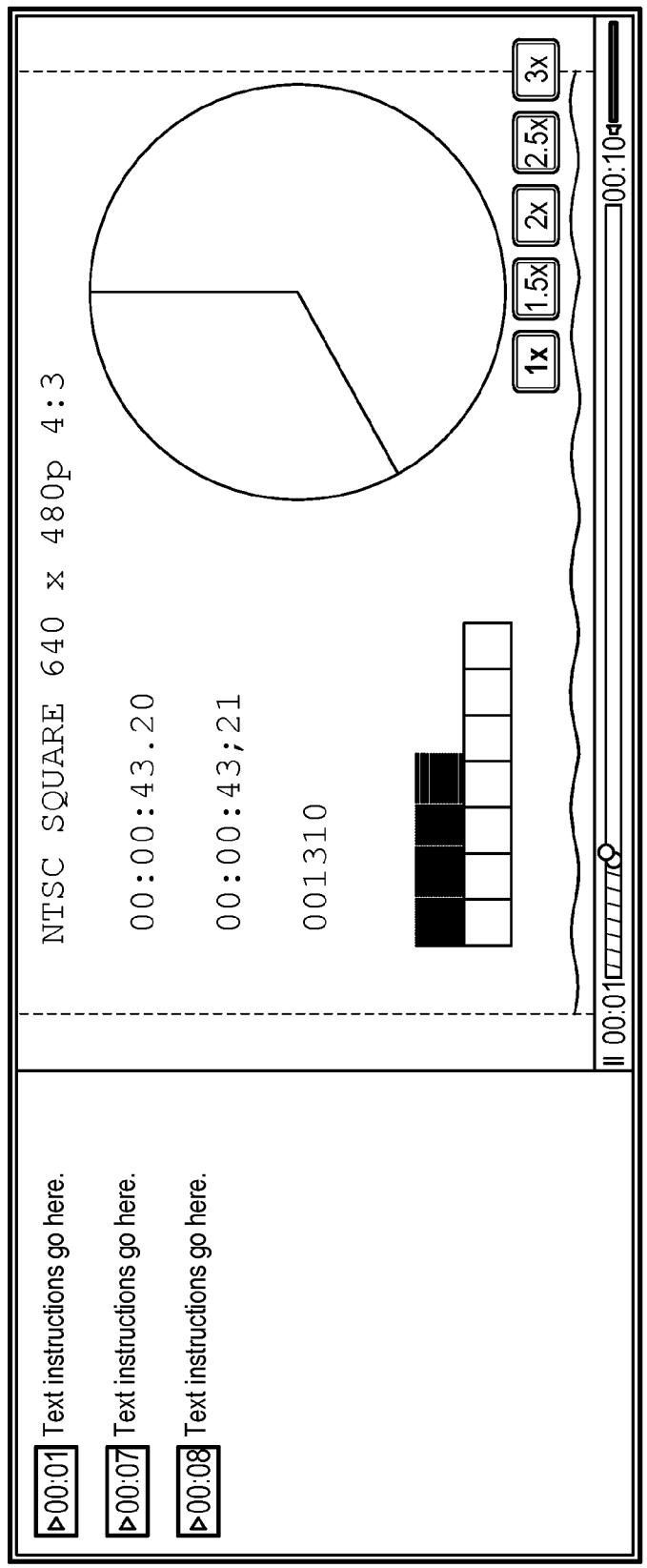
FIG. 13 illustrates using click points to create a Text Integration Outline, in accordance with various embodiments.

FIG. 13 illustrates using click points to create a Text Integration Outline, in accordance with various embodiments. A user can browse through video frames associated with each user event and select which events they would like to appear as a timestamp in the text instruction outline of the video and/or as a mark on the video timeline. Once selections had been made, the user can enter a text description for each selected event. The timestamps will be shown next to the video (where the companion text will appear) for each user event.

For example, if the video shows how to check email on Gmail, the first user event that occurs may be the user clicking to open a web browser. The second event that occurs may be clicking on the address bar to type gmail.com. The text descriptions entered for these events might be "1) open your web browser", "2) type in "gmail.com" in the address bar, and 3) press the Enter key.

Speed Up Video Processing

Time stamps from "events" can also be used to reduce significantly the processing power required for a number of features, such as blurring and making text searchable within a video by using optical character recognition ("OCR") on text within the video frames. These features are described in more detail in the respective sections.

Tags

In various embodiments, metadata tags can be added to content to facilitate searching.

Content Expiration Dates

In various embodiments, a piece of content (e.g., a video) can be set to expire on a particular date/time. Upon expiration of a piece of content, the server hides or deletes the content.

Custom Video Templates

In various embodiments, video templates are available to content creators. A video template can be used to generate videos that include some pre-recorded content. In various embodiments, content creators are able to create custom video templates and save the custom video templates for future use in creating content.

FIG. 14 illustrates a companion text/bookmark feature, in accordance with various embodiments. During video playback or while a video is paused, a user can click on the bookmark icon (not shown). Upon clicking the bookmark icon, the video pauses (if it is not paused already) and a bookmark dialog box 1402 appears. The user can enter text into the text box 1404 of the bookmark dialog box 1402. Upon clicking the "OK" button 1406 of the bookmark dialog box 1402, the text in the text box 1404 of the bookmark dialog box 1402 is associated with the spot in the video where the video was paused.

Figure 15:
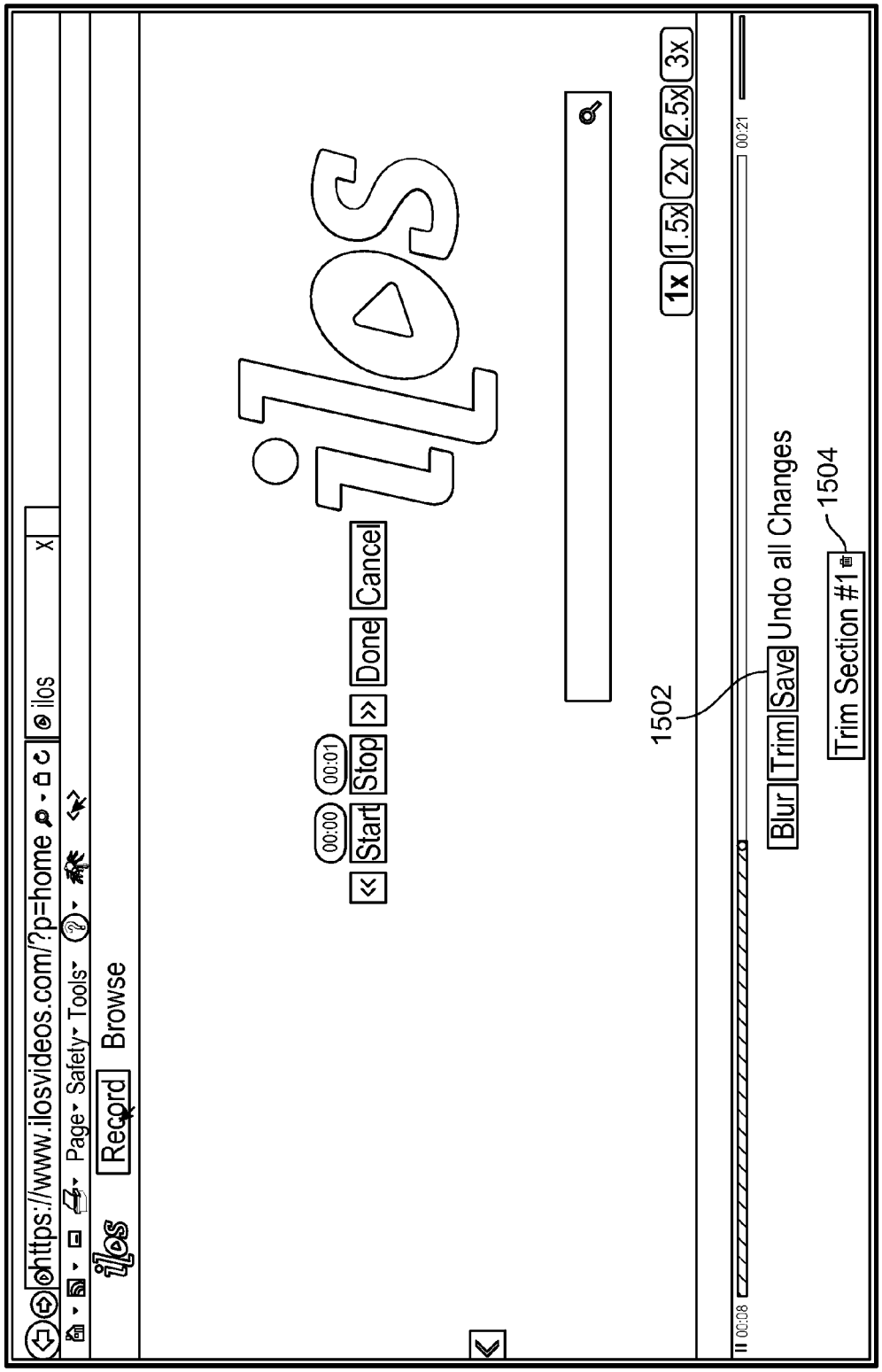
FIG. 15 illustrates a video trimming feature, in accordance with various embodiments.

FIG. 15 illustrates a video trimming feature, in accordance with various embodiments. In various embodiments, video trimming allows a user, such as a content creator, to trim out parts of a video. In various embodiments, the video trimming interface includes a set start and set stop button. These buttons are used to select which section of the video should be removed.

In various embodiments, a recommend video feature includes a recommend button or hyperlink allows a user to recommend a video to another user. In various embodiments, the recommend video feature allows a user to recommend a video to other users by selecting the recommend button or hyperlink associated with the video.

In various embodiments, a notification displayed to a user upon receiving a recommendation for a video, in accordance with various embodiments. In various embodiments, upon a user receiving a recommendation for a video, a notification may be displayed, such as in a drop-down notification box.

In various embodiments, a content privacy feature allows a user to prevent a video from appearing in a search. In various embodiments, a content privacy feature allows a user to prevent a video from appearing in the video database. In various embodiments, a content privacy feature allows a user to limit viewing of the video to a certain user group. In various embodiments that restrict viewing to a certain user group, an interface may be presented to the user to allow the user to select which user group(s) is(/are) able to view the video.

In various embodiments, an organization is able to manage its own custom user groups via a user group management interface. The user group management interface allows the organization to make certain content viewable (or even visible in a search) to certain users but not others. For instance, when a user creates a video, the user is able to choose which user group(s) should be able to view the video and/or have it appear in search results.

Image Obscuring and Replacement

General Overview

The image obscuring and replacement feature allows a user to select an item, such as text, an image, an icon, or visual element appearing in a video, and have that selected item obscured or replaced by a different item wherever and whenever the selected item appears in the video. With automatic obscuring or replacement of selected pixel patterns, users do not need to identify and manually obscure or replace every instance in the video where the information appears. In some embodiments, obscuring is achieved by blurring, opaquing, shading, darkening, dimming, concealing, or otherwise obfuscating the selected content.

The following is an example of how a user might use this feature. Suppose a student advisor at a university wants to make a video tutorial on "how to find which transfer credits are listed on your transcript". Suppose that to record the tutorial, the student advisor needs to use a student's actual transcript, which contains confidential information, such as the student's name and university account number. After recording the video, the image obscuring and replacement feature gives the student advisor the option to obscure or replace the specified content anytime the specified content appears in the video. The student advisor selects the areas on the transcript that show the student's name and the student's university account number, and submits the video for processing. After the video has been processed, every frame containing the selected areas on the transcript (that shows the student's name and student's university account number) will have those selected areas obscured or replaced with another image.

User Interface

The user interface of the image obscuring and replacement feature functions as follows: at any time while a user is in the "edit video" mode, the user can select any image (or portions of any image) in the video. The user is able to select an image in the video while the video is playing or while paused without needing to make any other prior selections to enable this feature. In some embodiments, simply selecting the video toggles playback of the video (e.g., starts and stops the video). In some embodiments, the user can select an area to be obscured or replaced by holding down a mouse button and dragging to create a bounding region, such as a rectangular bounding region. If the video is playing, a mouse click causes the video to pause and the mouse move creates the bounding region. If the video is already paused, a mouse click combined with moving the cursor creates the bounding region without starting the video. Once the bounding region has been created, the bounding region can be repositioned to any part of the video screen (e.g., via "drag-and-drop") by clicking anywhere inside the borders of the bounding region. Clicking on the outer border of the bounding region allows the user to resize and/or reshape the bounding region. After a user has created a bounding region, an "apply" button appears on a corner of the border of the bounding region. When the user clicks "apply," the application begins processing (e.g., transcoding) the video.

FIG. 15A illustrates bounding region inversion, in accordance with some embodiments. In some embodiments, an initial bounding region 1552 is selected within a selectable area 1550 (e.g., window frame). The crosshatched areas of FIG. 15A denote bounding regions. After the initial bounding region 1552 has been selected, a user is able to select an option to invert the initial bounding region 1552. This is called "bounding region inversion." Inverting an initial bounding region 1552 effectively selects all of the area outside 1554 of the initial bounding region 1552 but within selectable area 1550 as the new bounding region and deselects all of the area inside the initial bounding region 1552 so that it is no longer in a bounding region.

In some embodiments, more than one bounding region 1552 can be created within a selectable area 1550. FIG. 15B illustrates inverting multiple bounding regions 1552, in accordance with some embodiments. In some embodiments that allow multiple bounding regions 1552 to be created and that allow bounding region inversion, a user is able to invert one, some, or all bounding regions created within a frame.

In some embodiments, a user is able to select the entire viewable desktop as the bounding region 1552; in doing so, for every instance of the desktop image (or the unobstructed portions thereof), appearing in the video, the desktop image (or the unobstructed portions thereof) will be obscured or replaced. For example, if a user has items (e.g., icons, playlists, or open windows containing private content) on the desktop that the user does not want visible in the video, the user could select the desktop image as the bounding region rather than removing from the desktop all of the sensitive content (e.g., desktop content the user does not want in the video) prior to recording and moving back to the desktop all of the sensitive content post-recording.

Figure 16:
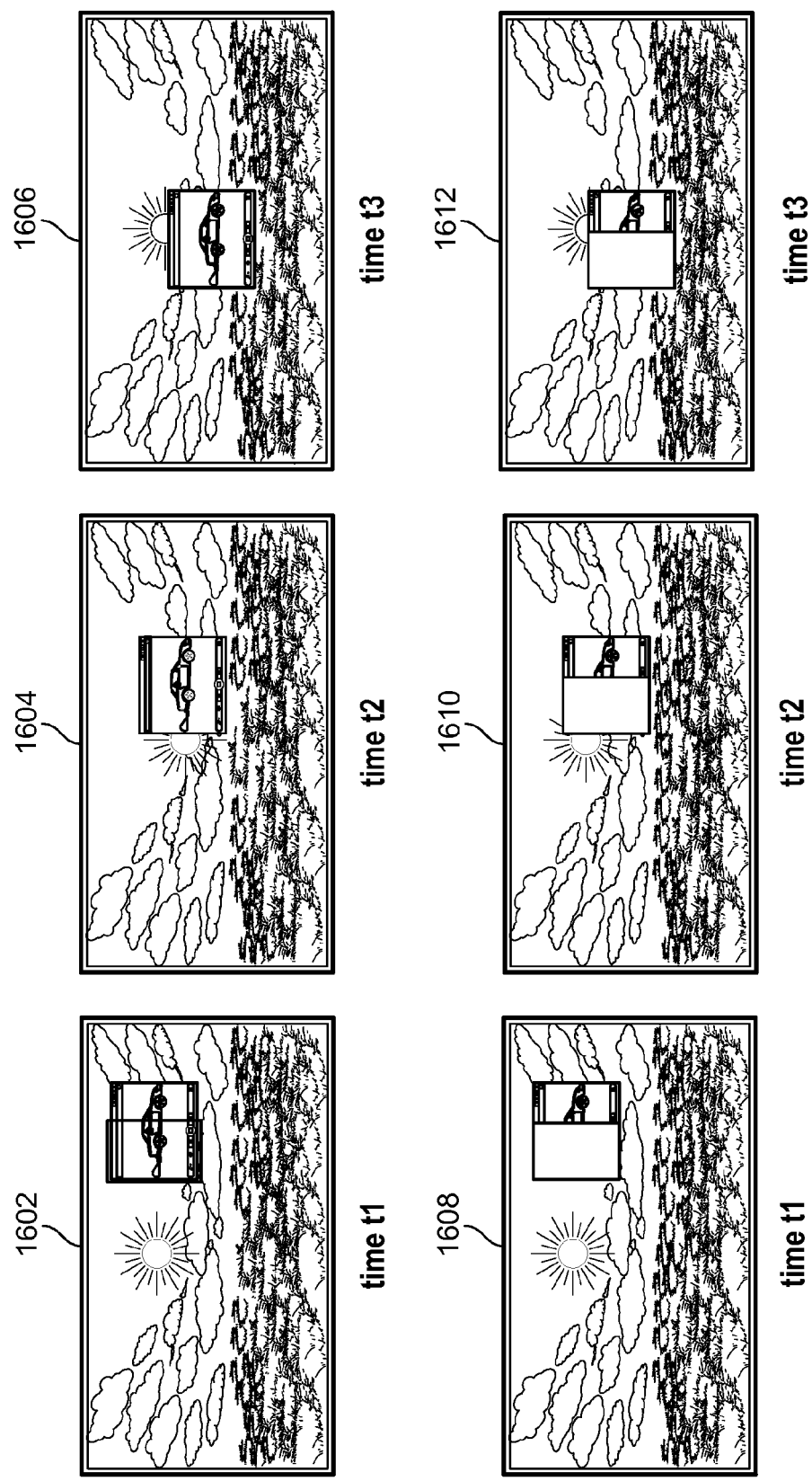
FIG. 16 illustrates image recognition and blurring, in accordance with various embodiments.

FIG. 16 illustrates image obscuration and replacement, in accordance with some embodiments. Screenshots 1602, 1604, and 1606 each show a frame of a video at time t1, t2, and t3, respectively. Screenshot 1602 shows a rectangular bounding region bounding the left half of a window displaying a drawing of a car. After the user selects "apply" (not shown), the video is processed to find each frame of the video containing the portion of the image bounded by the rectangular bounding region. After processing the video, the frame portion of each frame that had contained a portion matching the image bounded by the rectangular bounding region is obscured or replaced with another image. In FIG. 16, the screenshots 1608, 1610, and 1612 each show the frame of the processed video at times t1, t2, and t3, respectively. As shown, screenshots 1608, 1610, and 1612 show the region bounded by the rectangular bounding region (that had bounded the left half of a window displaying a drawing of a car) obscured or replaced.

In some embodiments, if "Live Preview" is disabled, the user pauses the video to find an item that the user wants to obscure or replace. The user then selects an item by selecting a bounding region (e.g., a rectangular bounding region) around the item. Multiple items may be selected within the same frame. Upon selection, the frame number and the coordinates of the bounding region are saved as an ordered triple and placed in an array. In some embodiments with a rectangular bounding region as the bounding region, the coordinates of the bottom left hand corner and top right corner of the rectangular bounding region are the coordinates. The two coordinates provide sufficient information to recreate the original rectangular bounding region. The user may navigate to other frames within the video to select additional items for obscuring or replacement. In some embodiments, after the user has finished selecting items within the video, the user submits the video for processing (e.g., transcoding).

The array of coordinates and the file path of the video are passed from the client computer (e.g., the user's computer) to a server. In some embodiments, a program is invoked on the server; the program accepts as input the array of coordinates and the file path. The program sequentially selects each ordered triple within the array of coordinates and performs the following algorithms:

Algorithm 1 (Edge Detection):

An edge detection algorithm is used to reduce the amount of pixel information in the template image (the image to be obscured or replaced) and each frame, thus deleting excess information and reducing computation time. The edge detection algorithm is first applied to the template image, and then sequentially to each frame of the video.

Algorithm 2 (Template Matching):

Using a template-matching algorithm, a position value will be assigned to every position in which the template image could fit within the frame. In some embodiments, if a position value is below a predefined threshold, then the frame sub-image at that position will be considered a match; all other position values will be ignored. Upon finding a match, the coordinates of the upper left hand corner of the template image with respect to the frame are saved (e.g., given a frame with dimensions m×n and a template image with dimensions a×b, any coordinate falling within m-a×n-b will be assigned a value). These coordinates effectively allow identification of the area(s) of the frame that is to be obscured or replaced.

In some embodiments, a position value is calculated using one of the formulas:

1. $R(x, y) = \Sigma_{x',y'} (T(x', y') - I(x+x', y+y'))^2$

2. $R(x, y) = \dfrac{\Sigma_{x',y'} (T(x', y') - I(x+x', y+y'))^2}{\sqrt{\Sigma_{x',y'} T(x', y')^2 \cdot \Sigma_{x',y'} I(x+x', y+y')^2}}$ 3. $R(x, y) = \Sigma_{x',y'} T(x', y') \cdot I(x+x', y+y')$ 4. $R(x, y) = \dfrac{\Sigma_{x',y'} T(x', y') \cdot I(x+x', y+y')}{\sqrt{\Sigma_{x',y'} T(x', y')^2 \cdot \Sigma_{x',y'} I(x+x', y+y')^2}}$ 5. $R(x, y) = \Sigma_{x',y'} T'(x', y') \cdot I'(x+x', y+y')$ 6. $R(x, y) = \dfrac{\Sigma_{x',y'} T'(x', y') \cdot I'(x+x', y+y')}{\sqrt{\Sigma_{x',y'} T'(x', y')^2 \cdot \Sigma_{x',y'} I'(x+x', y+y')^2}}$ where $T'(x',y')=T(x',y')-1/(w \cdot h) \cdot \Sigma_{x'',y''} T(x'',y'')$ and $I'(x+x',y+y')=I(x+x',y+y')-1/(w \cdot h) \cdot \Sigma_{x'',y''} T(x+x'',y+y'')$ where T(x,y) is the pixel value of the template image at coordinates (x,y) and I(x,y) is the pixel value of the frame image at coordinates x,y. T(x',y') is the pixel value in the template image at point (x',y') and I(x+x',y+y') is the pixel value in the frame at the point (x+x',y+y'), where (x,y) is the coordinate of the upper left hand corner of the sub-image (inside of the frame image), which is being compared to the template image.

In some embodiments, a pixel value is the intensity of the pixel when converted to greyscale (e.g., a number from 0 to 255, where 0 denotes black and 255 denotes white). In some embodiments employing an edge detection algorithm that converts all pixels to either black or white, the pixel values will be either 0 or 255. The threshold is determined by how close T(x',y') and I(x+x',y+y') should be.

In some embodiments, the lower the value of R(x,y) for a position, the more likely the sub-image at that position matches the template image.

Formulas 1, 3, and 5 for R(x,y) are not scaled, whereas formulas 2, 4, and 6 are scaled to produce a real number value from 0 to 1. Therefore, formulas 2, 4, and 6 are particularly useful for analyzing video to find a template image, because a threshold is difficult to set when certain details, such as image size and template image size, are unknown. Formulas 1, 3, and 5 are particularly useful for analyzing a single image to find a template image.

Obscured Items

The threshold also allows for tracking obscured items. The threshold essentially sets a value for when a set of pixels is considered a match for the template image. In some embodiments, the threshold of what is considered a match may be adjusted. For more information, see FIG. 29A.

Live Preview

The "Live Preview" option allows a user to preview the changes the user makes while editing a video, before the video file is actually modified. In "Live Preview" enabled mode, after the images to be obscured or replaced have been selected and the matching algorithm has completed, the user is able to see changes (e.g., blurred images) without the changes being made permanent to the video file. After the changes are saved, a new, modified video file is generated. The original video file may be kept or discarded. If the original video file is kept and "Live Preview" mode is enabled, when opened in the "Edit Videos" page, the original video file will appear in the "Live Preview" with image obscuring/replacement artificially applied on the client side. Because the original video file is still available, image obscuring/replacement changes can be reverted.

Image Replacement

In some embodiments, Image Replacement hides a template image by switching it with an alternate image. This alternate image can be selected from a set of stock images in various sizes/dimensions, or the user can select an alternate image. After the template image is selected and the matching algorithm runs, the user is able to replace the template image with the alternate image. In some embodiments, this feature can use the same algorithms described above.

Obscuring Before and After the Algorithm Locates a Match

To assist the user in selecting items to obscure, the bounding region can be shown found at the same location within the frame preceding the first frame where a match to the template image is found. The obscuring region can also be shown at the same location within the frame following the last frame where a match to the template image is found. The bounding region may also be larger during these times, to increase the probability that the region to obscure is obscured successfully in certain situations, such as if the tracking algorithm was unable to locate region to obscure in the frame. Displaying the obscuring region before the first match and after the last match offers the user an opportunity to reduce the likelihood that the information to obscure is missed.

Undo Changes

To allow a user to undo changes, the original copy of the video file may be kept along with the coordinates of the desired bounding region, in case the user (or another authorized user) wants to modify which parts of the original video are to be obscured or replaced. The user has the option to delete the original video file entirely.

Once image processing is complete (that is, once the timestamps and coordinates of the item in the video are found), the timestamps and coordinates to blur are sent to the client and a box is drawn over the appropriate section(s) of the video where that image appears, thus creating a real-time "live preview" of the modifications made without requiring the user to wait until a new modified video file has been generated. This allows the user to see which items have already been blurred without needing to generate a new video file. Once the user has blurred all desired items, the user presses "finish," which causes a new modified version of the video file to be created (with all appropriate areas blurred) and available for viewing by other users.

In the event that the automatic blurring is not able to track the item the user is attempting to blur, the user can blur portions of the video manually as follows:

1. The user seeks the video until the first instance the region to blur appears.

2. The user draws a box around the region that is to be blurred.

3. The user presses the "mark time in" button to indicate the beginning time for the region to be blurred.

4. The video is played through the last frame containing the region to be blurred.

5. The user presses the "mark time out" button to indicate the end time for the region to be blurred.

6. The user presses a "Done" button to send the data to the server.

7. The server stores the data in a database linked to the corresponding video.

8. The server modifies the video file to blur the desired region at the specified times.

Processing

The image recognition and blurring feature will then blur the selected pattern of pixels whenever the pattern of pixels is recognized in the video. This feature uses "user events" (see "Associating Input Events to Timestamps" for more information on "user events").

The application recognizes pixel patterns of the video frames on the server to find the coordinates and times of every instance the boxed items appear in the video.

The original copy of the video file is stored along with the coordinates of the desired blur boxes in case the user (or other authorized users) wants to modify which parts of the original video are blurred. The user has the option to delete the original video file entirely.

To reduce processing requirements of finding coordinates of the boxed items throughout the video, user event timestamps and algorithms are used. As described in the "Associating Input Events to Timestamps" section, the timestamps are captured by the screen recorder any time a mouse click, scroll, key press, or any other user-initiated event occurs. To reduce the number of video frames for which coordinates need to be found, the application assumes that the coordinates of the item being tracked do not change unless a user event occurs. In this way, a significant number of the video frames (i.e., those that occur between user events) do not need to be processed. Where a user event occurred, the program scans the corresponding video frame for possible new coordinates of the item. The number of video frames processed, or whether the associated video frame is processed at all, may depend on the type(s) of user events that occur and the likelihood that the user events will change the item's coordinates. For example, more video frames may be processed for coordinates if the mouse was dragged or a key was held down than if a mouse button was simply clicked. When user events indicate that movement is occurring on the screen (e.g., a mouse scroll or a mouse button-click followed by movement of the cursor) the following algorithm is used to predict the path of the item.

Motion Tracking

Upon identifying a frame in which an item is found, if the item has moved between frames, the motion-tracking algorithm uses the item's location in the already scanned frames to predict the item's path within the video. Using this path, the unscanned frames may be scanned faster by first searching the area where the item is expected to be. In the following illustrated example, let $t_1, t_6 \ldots t_{31}$ be the frames at some sequential, arbitrary times within a video.

Figure 17:
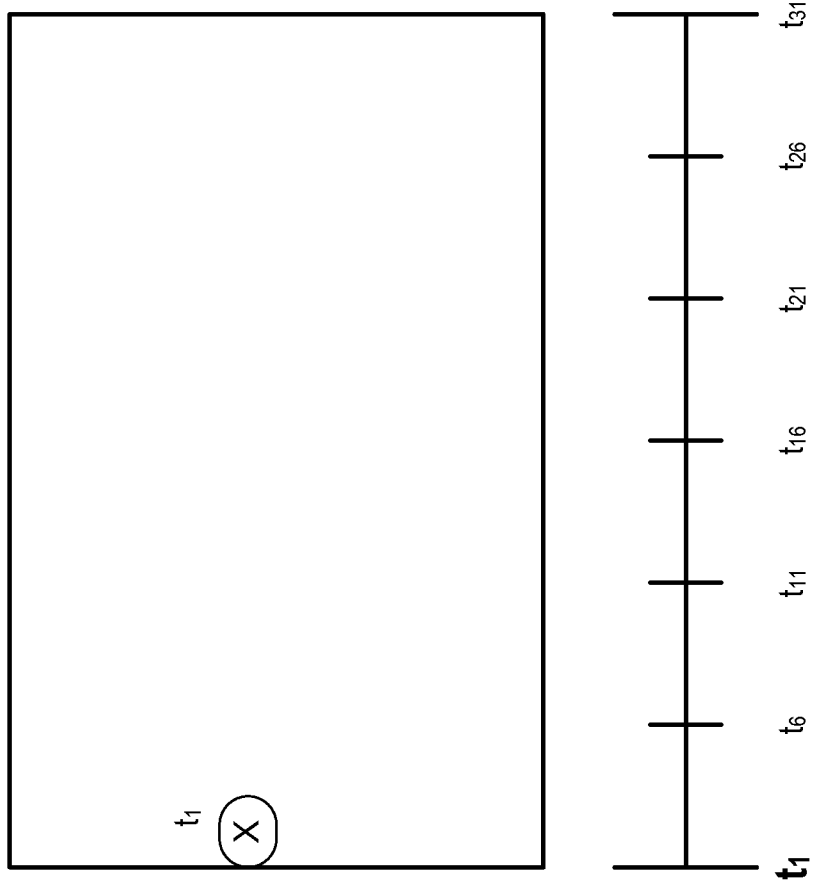
FIG. 17 illustrates a position of an item, whose motion is tracked within a video, in accordance with various embodiments.

FIG. 17 illustrates a position of an item, whose motion is tracked within a video, in accordance with various embodiments. The position of item "X" is analyzed at time $t_1$ of the video.

Figure 18:
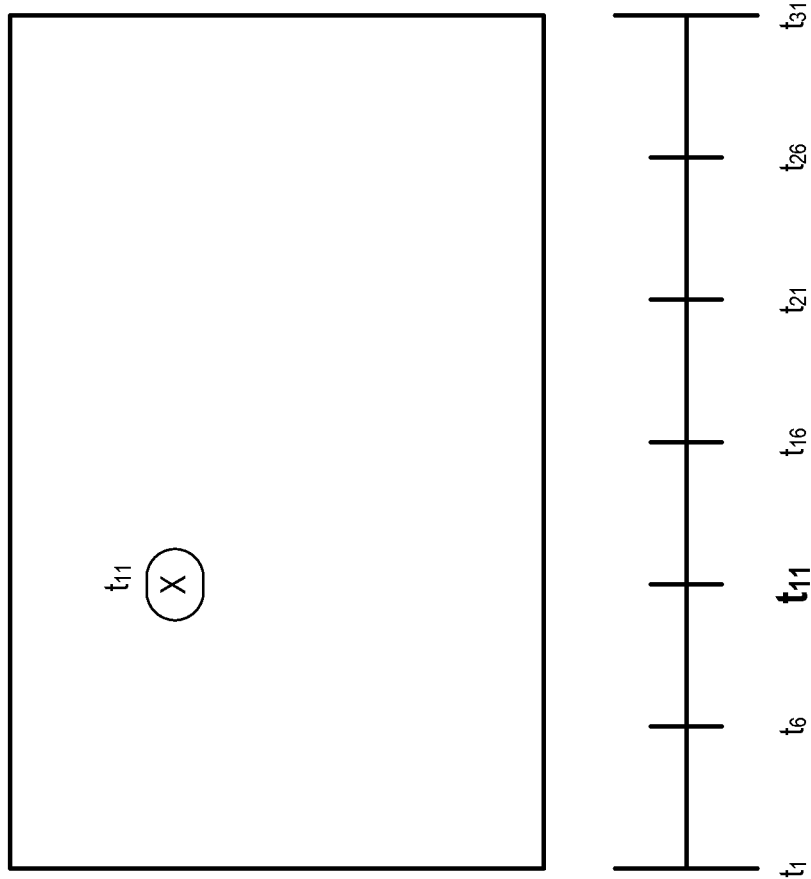
FIG. 18 illustrates another position of an item, whose motion is tracked within a video, in accordance with various embodiments.

FIG. 18 illustrates another position of an item, whose motion is tracked within a video, in accordance with various embodiments. At time $t_{11}$ of the video, the position of item "X" is also analyzed and compared to the position of item "X" at time $t_1$. If a difference is found for the position of item "X" between time $t_1$ and time $t_{11}$, then the position of item "X" at time $t_6$ of the video (FIG. 19) will be analyzed.

Figure 19:
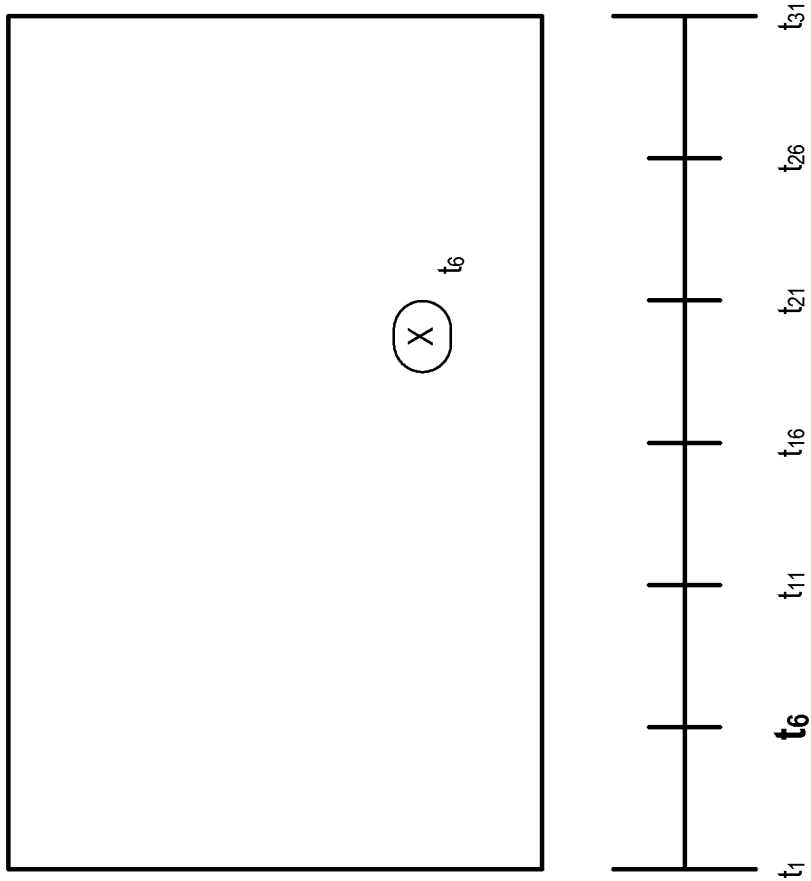
FIG. 19 illustrates another position of an item, whose motion is tracked within a video, in accordance with various embodiments.

FIG. 19 illustrates another position of an item, whose motion is tracked within a video, in accordance with various embodiments. The position of item "X" is analyzed at time $t_6$ of the video.

If a difference is found for the position of item X between frames $(t_1, t_6)$ and $(t_6, t_{11})$, then the ordered triple $(p_1, p_6, p_{11})$ is recorded for interpolation (where this ordered triple represents the respective positions of item "X" at times $t_1, t_6$, and $t_{11}$ of the video).

Once that set of three frames is analyzed, the process starts over by analyzing the position of item "X" at time $t_{21}$ (FIG. 20) of the video and comparing it to the position of item "X" at time $t_{11}$ of the video.

Figure 20:
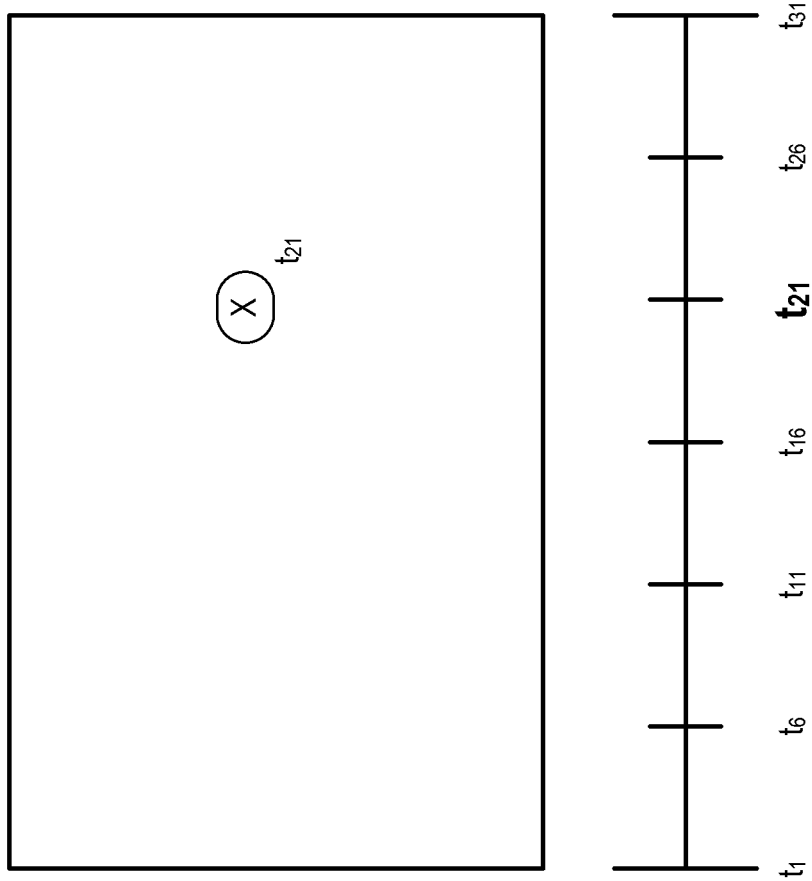
FIG. 20 illustrates another position of an item, whose motion is tracked within a video, in accordance with various embodiments.

FIG. 20 illustrates another position of an item, whose motion is tracked within a video, in accordance with various embodiments. The position of item "X" is analyzed at time $t_{21}$ of the video.

If a difference for the position of item X is found, again, an analysis of the position of item "X" is performed at time $t_{16}$ of the video.

Figure 21:
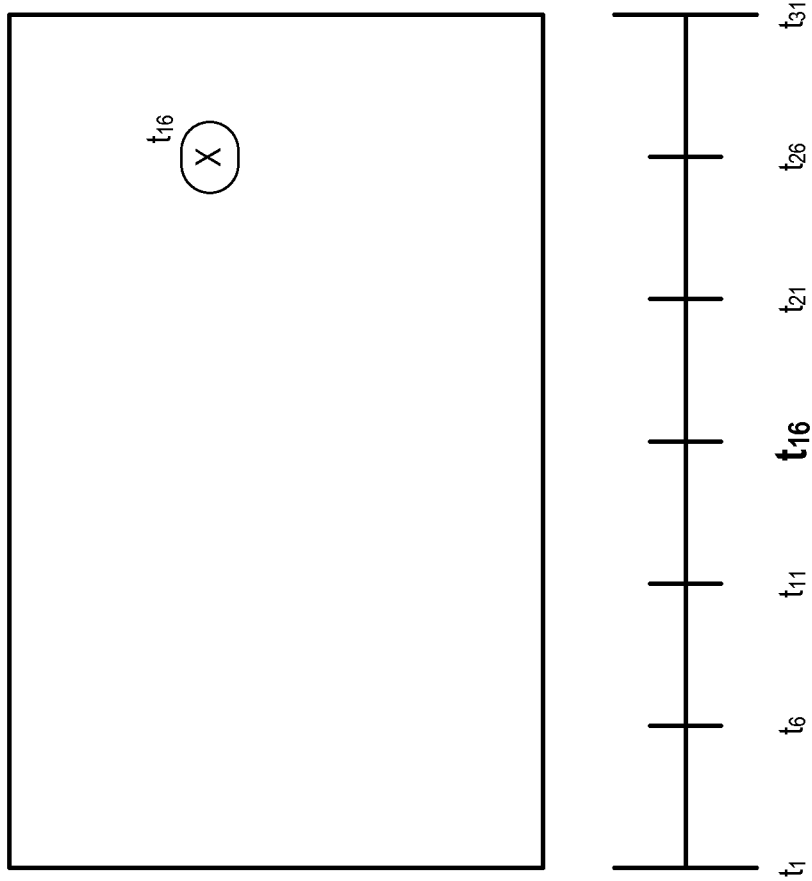
FIG. 21 illustrates another position of an item, whose motion is tracked within a video, in accordance with various embodiments.

FIG. 21 illustrates another position of an item, whose motion is tracked within a video, in accordance with various embodiments. The position of item "X" is analyzed at time $t_{16}$ of the video.

Figure 22:
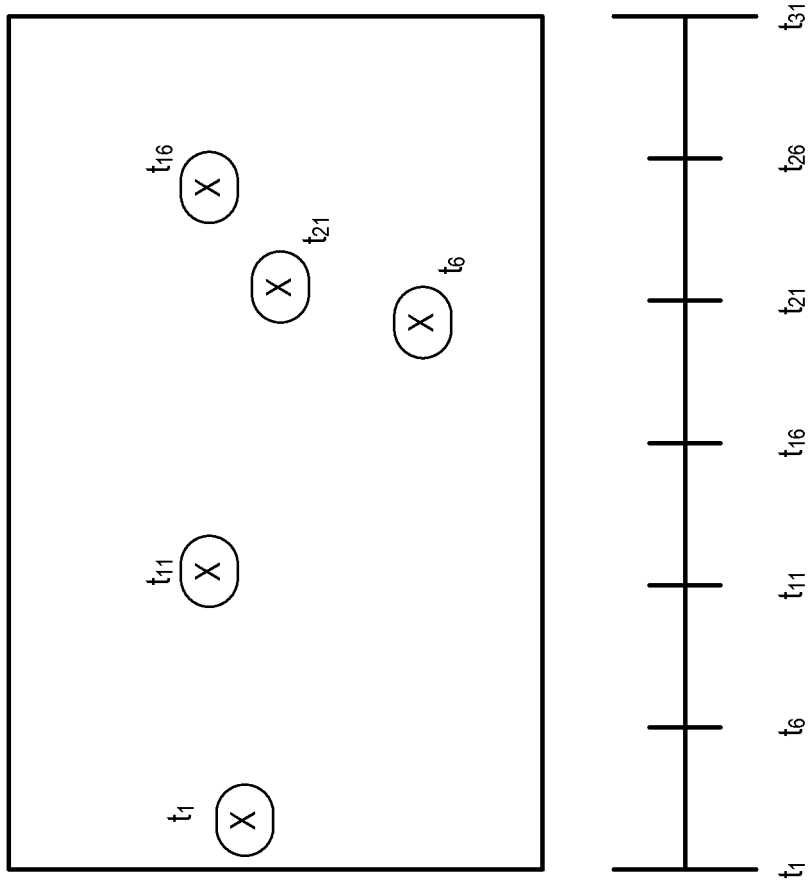
FIG. 22 illustrates the various positions of an item, whose motion was tracked within a video, in accordance with various embodiments.

FIG. 22 illustrates the various positions of an item, whose motion was tracked within a video, in accordance with various embodiments. After this analysis has been performed on all sets of three frames, an interpolation method will be used to interpolate the expected trajectory of item "X" within the remaining frames of the video.

Figure 23:
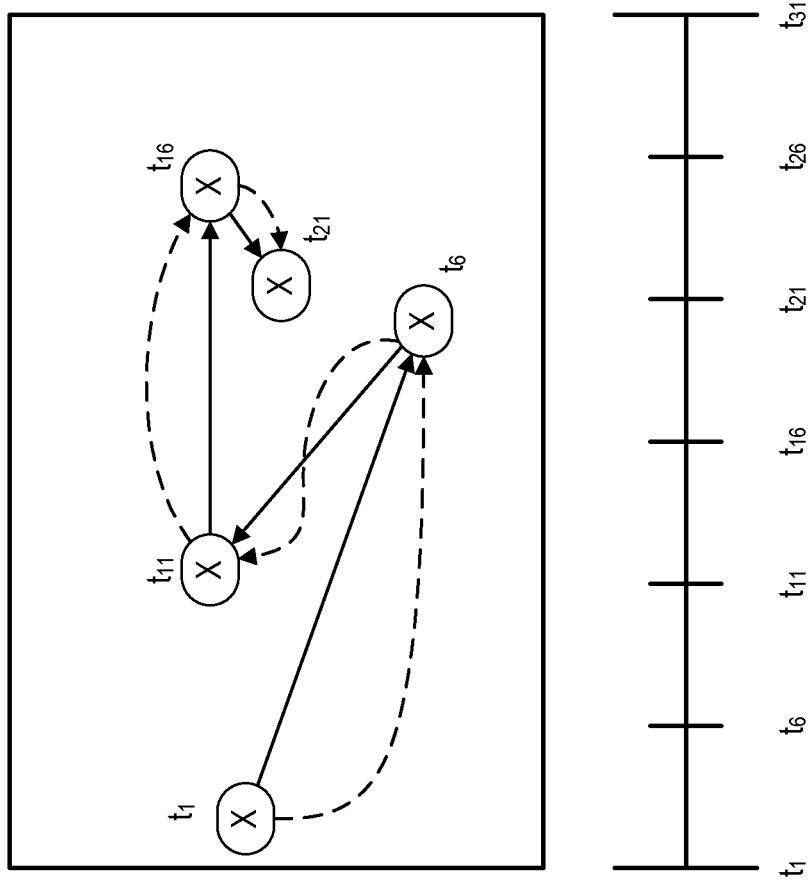
FIG. 23 illustrates interpolating a path of an item, whose motion was tracked within a video, in accordance with various embodiments.

FIG. 23 illustrates interpolating a path of an item, whose motion was tracked within a video, in accordance with various embodiments. Using the interpolated trajectory, the rest of the frames that have not been scanned (such as $t_2$-$t_5$) can be quickly scanned. With each frame scan, the interpolated trajectory can also be updated.

On the other hand, simple key press events may be disregarded (resulting in no frames being processed) if that event is unlikely to change anything on the screen. An algorithm is used between user events to help ensure coordinates are not missed, and thus preventing the selected item from not being blurred properly because of not processing certain video frames for the item's coordinates.

Frame-Skipping Algorithm

A video, even a low-quality video, will have a large number of frames. For example, a 60-second video at 24 frames per second will have 60×24=1,440 frames. The image to blur can appear in none, some, or all of these frames. However, analyzing each frame individually may take longer than the user is willing to wait or may be too computationally expensive. Thus, a method of intelligently skipping analysis of frames can be used to find the item to blur without analyzing every frame of the video. This algorithm employs user events as hints to determine which frames might contain the item to blur.

A user event is any user-initiated input, which could cause the computer's display to change. Common user events are mouse moves, mouse button presses, and keyboard button presses. Although the audio within the recorded video may change between user events, the analysis algorithm assumes that the video image does not change between user events. Thus, the algorithm analyzes frames corresponding to user events within the video, and based on a change in the presence of the image to blur between two consecutive user events, determines whether to analyze frames in between the two consecutive user events.

The algorithm operates as follows:

For each user event, the algorithm scans the first frame corresponding to the user event. The algorithm records whether the item to blur appears in the frame.

The algorithm then scans the first frame corresponding to the next consecutive user event, and records whether the item to blur appears in the frame. If the outcome of this scan differs from the outcome of the previous scan, then the item to blur appears/disappears somewhere in between the frame for this scan and the frame for the previous scan. The algorithm searches in between these frames (recursing as necessary) until the first frame in which the item to blur appears/disappears is found.

Figure 24:
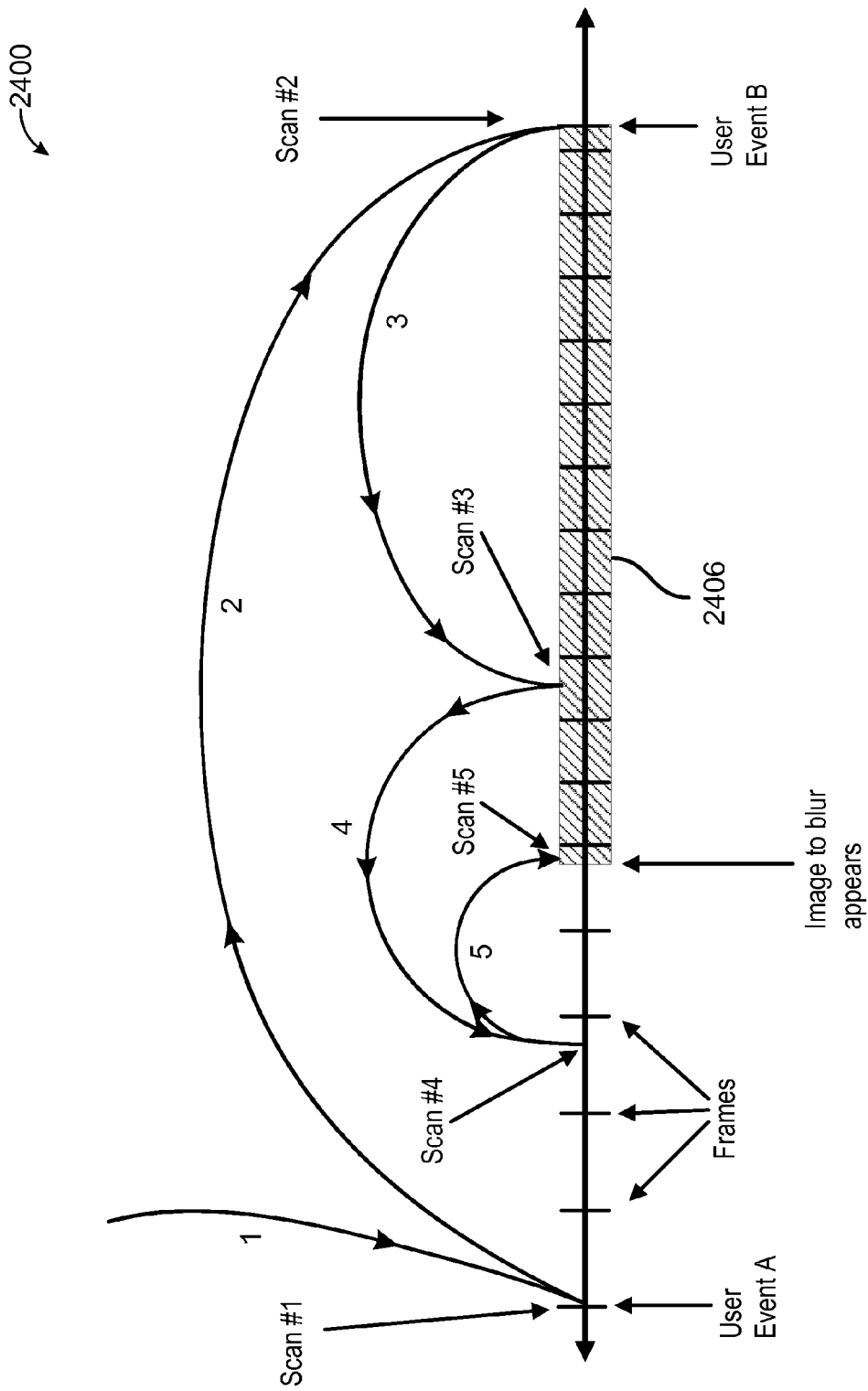
FIG. 24 illustrates an example of an analysis algorithm to analyze video frames in which the image to blur appears, in accordance with various embodiments.

FIG. 24 illustrates an example of an analysis algorithm to analyze video frames in which the image to blur appears, in accordance with various embodiments. Frames in which the item to blur appears are denoted by the crosshatched region 2406.

Scan 1. The algorithm scans (e.g., analyzes) the frame in which user event A first appears, and records that the item to blur did not appear in that frame.

Scan 2. The algorithm scans the frame in which user event B first appears. The analysis algorithm detects the item to blur in the frame, and saves the coordinates. The algorithm will then jump to an earlier frame to search for the first appearance of the item to blur.

Scan 3. The algorithm jumps to a frame in between the frames of scan #1 and scan #2. For example, if the algorithm is configured to use binary searching, the algorithm will jump to the frame that is approximately halfway between the frames of scan #1 and scan #2. The algorithm jumps to the selected frame and analyzes it; the frame analyzed by scan #3 contains the item to blur, so the algorithm will continue to recurse until it finds the frame in which the item to blur first appears.

Scan 4. The algorithm jumps to the frame that is approximately halfway between the frames of scan #3 and scan #1. The algorithm analyzes the selected frame; the frame analyzed by scan #4 does not contain the item to blur, so the algorithm assumes that the item to blur first appears somewhere between the frame of scan #4 and the frame of scan #3.

Scan 5. The algorithm jumps to the frame that is approximately halfway between the frames of scan #4 and scan #3. The algorithm analyzes the selected frame; the frame analyzed by scan #5 contains the item to blur. If there is at least one frame in between the frames of scan #4 and scan #5, the algorithm will continue to recurse until the algorithm identifies the frame in which the item to blur first appears.

Figure 25:
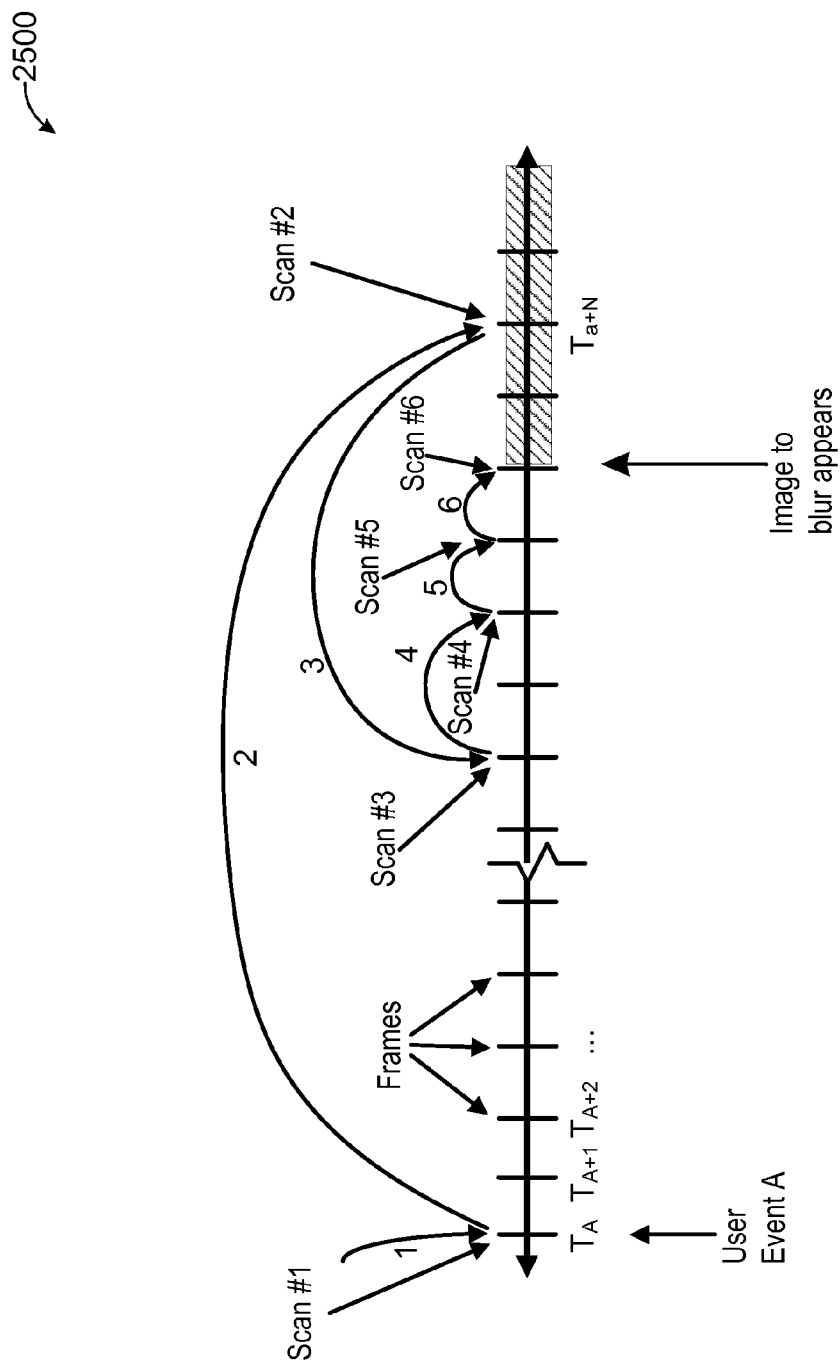
FIG. 25 illustrates an analysis algorithm to detect video frames in which the image to blur appears, in accordance with various embodiments.

FIG. 25 illustrates an analysis algorithm to detect video frames in which the image to blur appears, in accordance with various embodiments. If user events are too far apart or nonexistent, then every N frames will be scanned, where N is some configured number. The number N can be configured to correspond to a maximum time between frame scans. The example illustrated in FIG. 25 shows user event A occurring at time $T_A$. However, no user event occurs between time $T_A$ and time $T_{A+N}$, so the algorithm will analyze the frame at time $T_{A+N}$. The algorithm will then continue as previously described.

FIG. 25 also illustrates sequential scanning of frames. In various embodiments, if a small number of unscanned frames exist between scanned frames, the algorithm can scan the small number of unscanned frames sequentially instead of jumping between frames.

Figure 26:
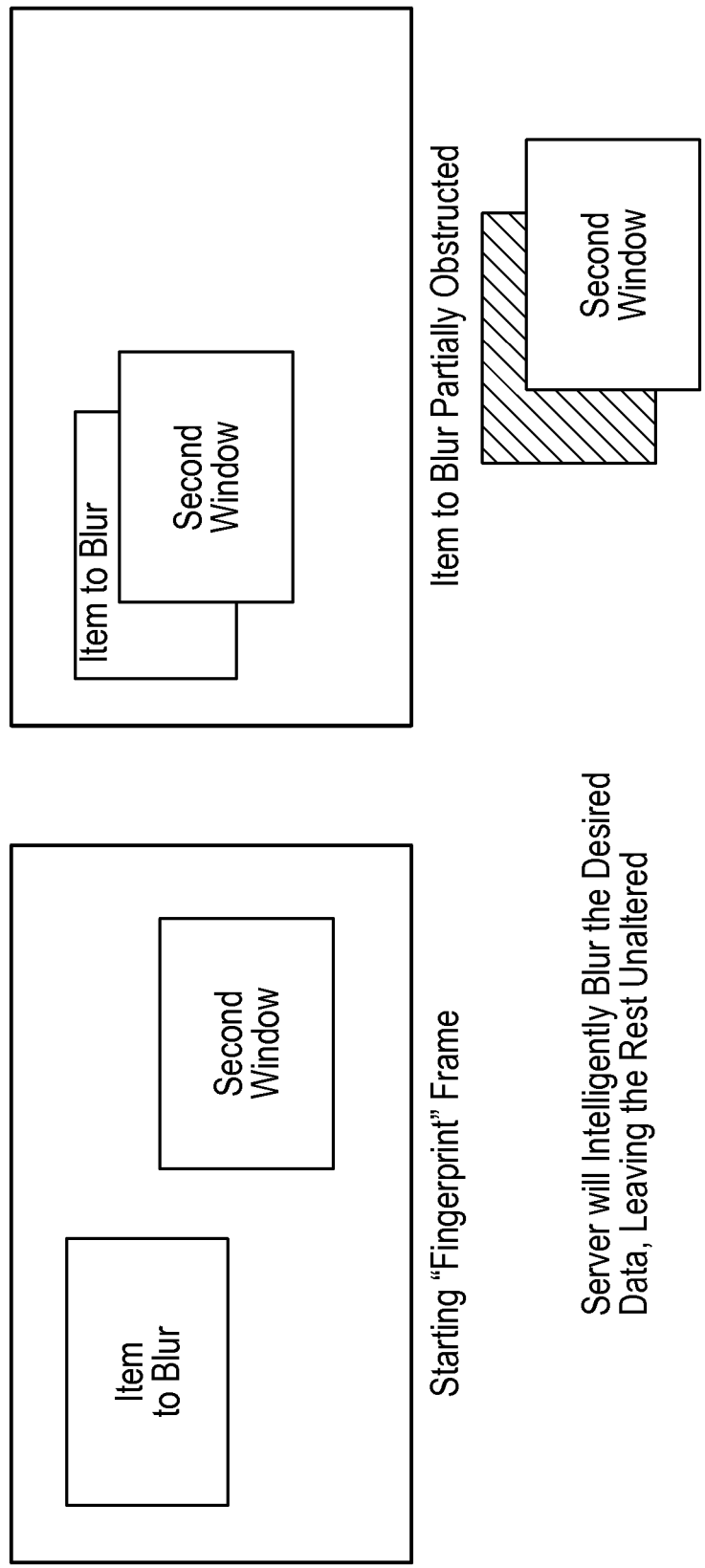
FIG. 26 illustrates intelligent blurring of partially obstructed items, in accordance with various embodiments.

FIG. 26 illustrates intelligent obscuration or replacement of partially obstructed items, in accordance with some embodiments. When an item to obscure or replace is partially obstructed elsewhere in the video, the item will still be detected and the portions of the item that are not obstructed will be obscured or replaced. The algorithm uses a matching threshold to detect partially obscured items. If a sub-image of a frame is within the matching threshold (e.g., the sub-image matches the image template at least X %), the algorithm will consider the sub-image to match the image template.

Other Features

Snap Recorder Back into View

Figure 27:
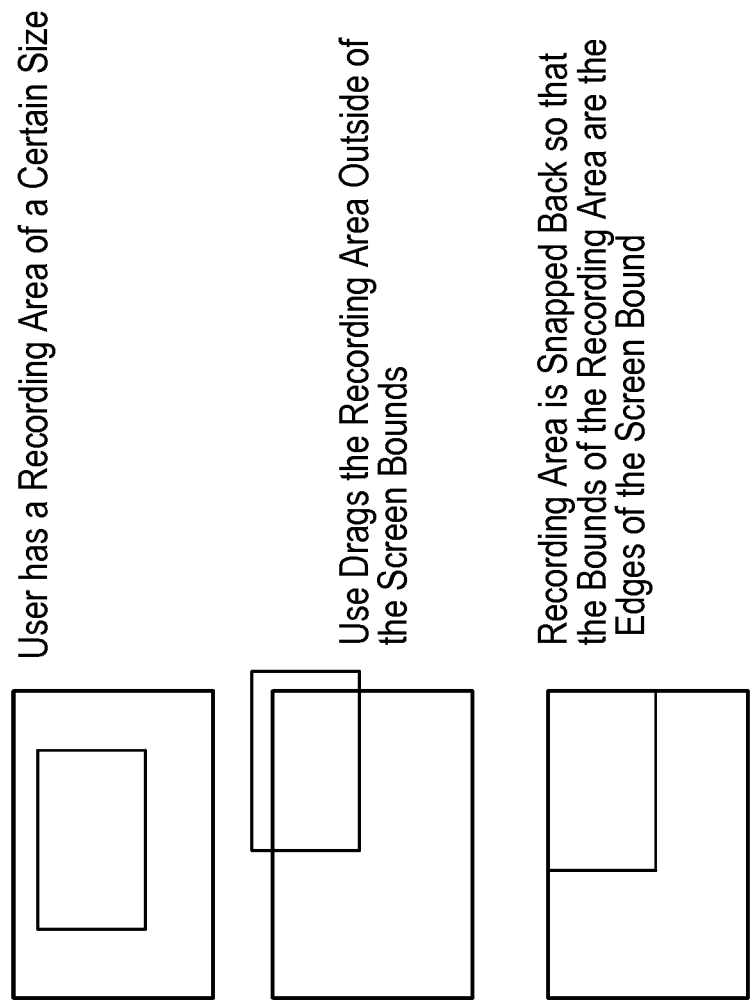
FIG. 27 illustrates bounding a screen recording area to the edges of a computer screen, in accordance with various embodiments.

FIG. 27 illustrates bounding a screen recording area to the edges of a computer screen, in accordance with various embodiments. When recording area is dragged outside the borders of the computer screen, the screen recorder will be snapped back to only record up to the very edge(s) of the screen.

Text Recognition for Search

General Overview

The "Text Recognition for Search" feature extracts text from videos and significantly reduces the processing power required by reducing the number of video frames that need to be processed.

User Interface

After processing of a video for text is complete, the user has the option to use the text extracted from the video as metadata so that the video can be more easily searched in the database. To prevent too much metadata from being added to the video, text extracted from the video is compared against a word library(s) of commonly appearing words. Words deemed unique can be used as metadata.

In various embodiments, location timelines for a video are displayed along with text appearing in the video at the associated timelines. A user enters text to search and the location of the text's appearance in the video is displayed in the video timeline. If multiple words/phrases are searched, multiple timelines can appear. The user can click the results displayed on the timeline to skip to the corresponding location in the video.

Processing

The frames are scanned in a similar fashion for text. An initial $frame_i$ is scanned for text using OCR, and the recognized text is saved. The algorithm then skips N number of frames ahead and compares $frame_{i+N}$ to the previously scanned $frame_i$. If $frame_{i+N}$ contains the same text as $frame_i$, then the algorithm will skip ahead another N frames. If the text is different, the algorithm will search backwards to find the first frame, in which the new text appeared. In some embodiments, the algorithm uses binary searching to determine the next frame number to scan. In some embodiments, N is set (e.g., configured) by the organization. In some embodiments, N is set by the user. In general, lower values for N will result in higher accuracy of the algorithm, but will also increase the time necessary for the algorithm to analyze the video. Conversely, higher values for N generally results in lower accuracy of the algorithm, but decreases the time necessary for the algorithm to analyze the video.

Text Recognition for Searching

Figure 28:
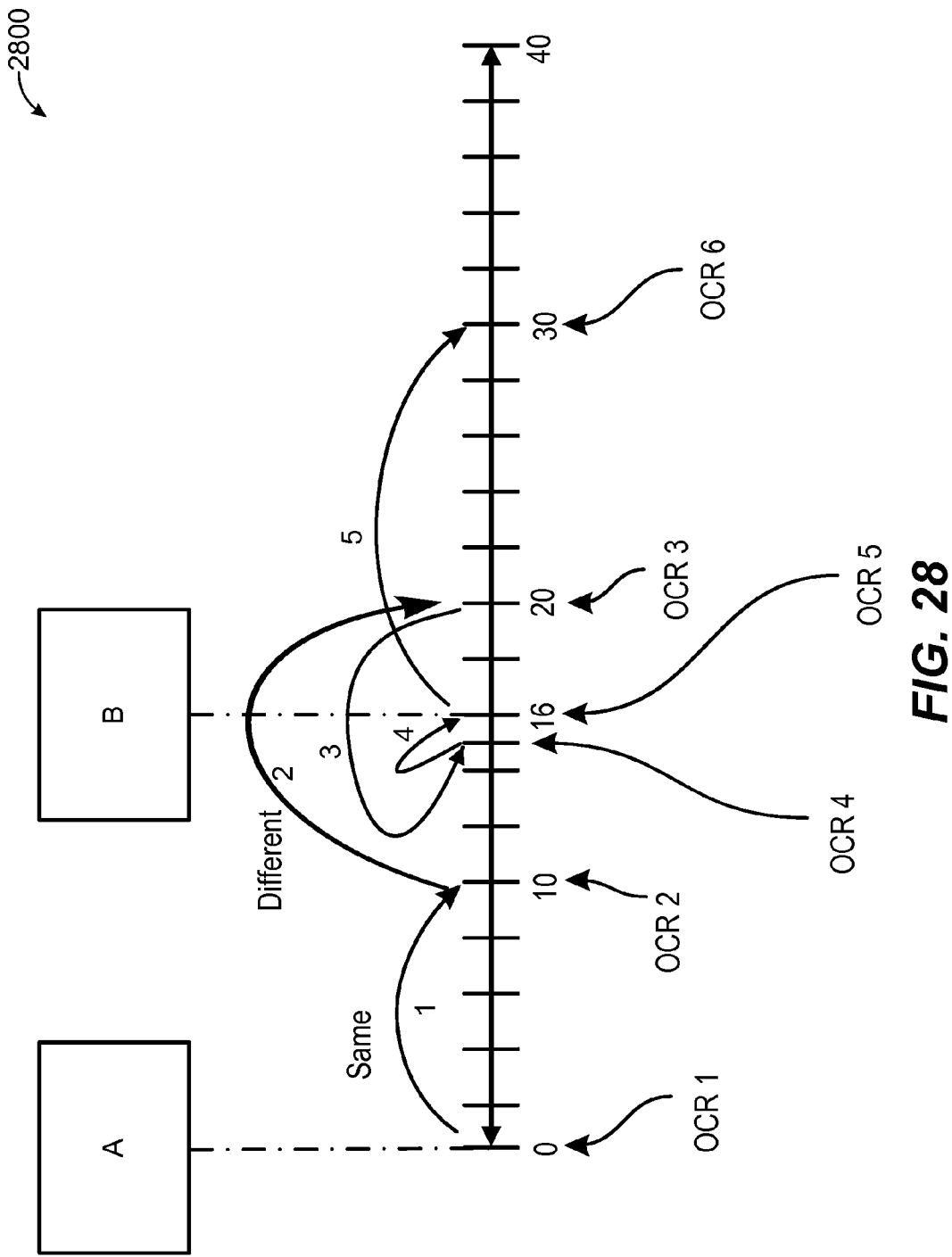
FIG. 28 illustrates text recognition for searching, in accordance with various embodiments.

FIG. 28 illustrates text recognition for searching, in accordance with various embodiments. Similar to the algorithm described in FIGS. 24 and 25, the algorithm for text recognition for searching will try to minimize the number of frames on which to perform OCR by determining the frames in which the text appears and disappears. The text and the time of the first frame, in which the text appeared, are saved in a database linked to the video. When a search is performed and a match is found, the times at which the text appears in the video are returned.

1. In the example illustrated by FIG. 28, the algorithm performs an OCR scan (OCR 1) at frame 0 and determines that frame 0 contains the text "A".

2. The algorithm jumps forward 10 frames and performs an OCR scan (OCR 2) of frame 10, which is determined to contain the same text "A".

3. The algorithm jumps forward another 10 frames and performs an OCR scan (OCR 3) of frame 20, which is determined to contain the text "B". The text in frame 20 differs from the text in frame 10, so the algorithm deduces that the text in the video changes from "A" to "B" at some frame between frame 10 and frame 20. Thus, the algorithm will try to detect in which frame the change occurs by analyzing one or more frames between frame 10 and frame 20.

4. The algorithm skips backwards to frame 15 and performs an OCR scan (OCR 4) of frame 15. The algorithm determines that frame 15 contains the text "A", so the first frame containing the text "B" has not yet been found. Thus, the algorithm will search forward.

5. There are four frames between frame 15 and frame 20, so rather than incurring the overhead of frame skipping (e.g., skipping to frame 17 or 18 and then going one or two frames backwards or forwards), the algorithm scans the frames sequentially. The algorithm performs an OCR scan (OCR 5) of frame 16, which is determined to be the frame where the text "B" appears for the first time.

6. The algorithm then returns to analyzing the rest of the video by proceeding from the highest numbered frame that has been OCRed (frame 20) until another change is detected. In this example, the algorithm skips forward 10 frames to frame 30, and performs an OCR scan (OCR 6) of frame 30.

Ratings

In various embodiments, the ratings feature allows users to give a "thumbs up" or "thumbs down" to videos they like or dislike, respectively. These ratings are displayed next to the thumbnail of videos. Video ratings are used in ordering search results and to help account administrators and content creators determine the usefulness of their videos and/or the knowledge they communicate.

Comments

Commenting allows a user to write a message below a video, which the video creator and other viewers can read. When a comment is written, the video creator is notified via an alert icon and an email notification.

Figure 29:
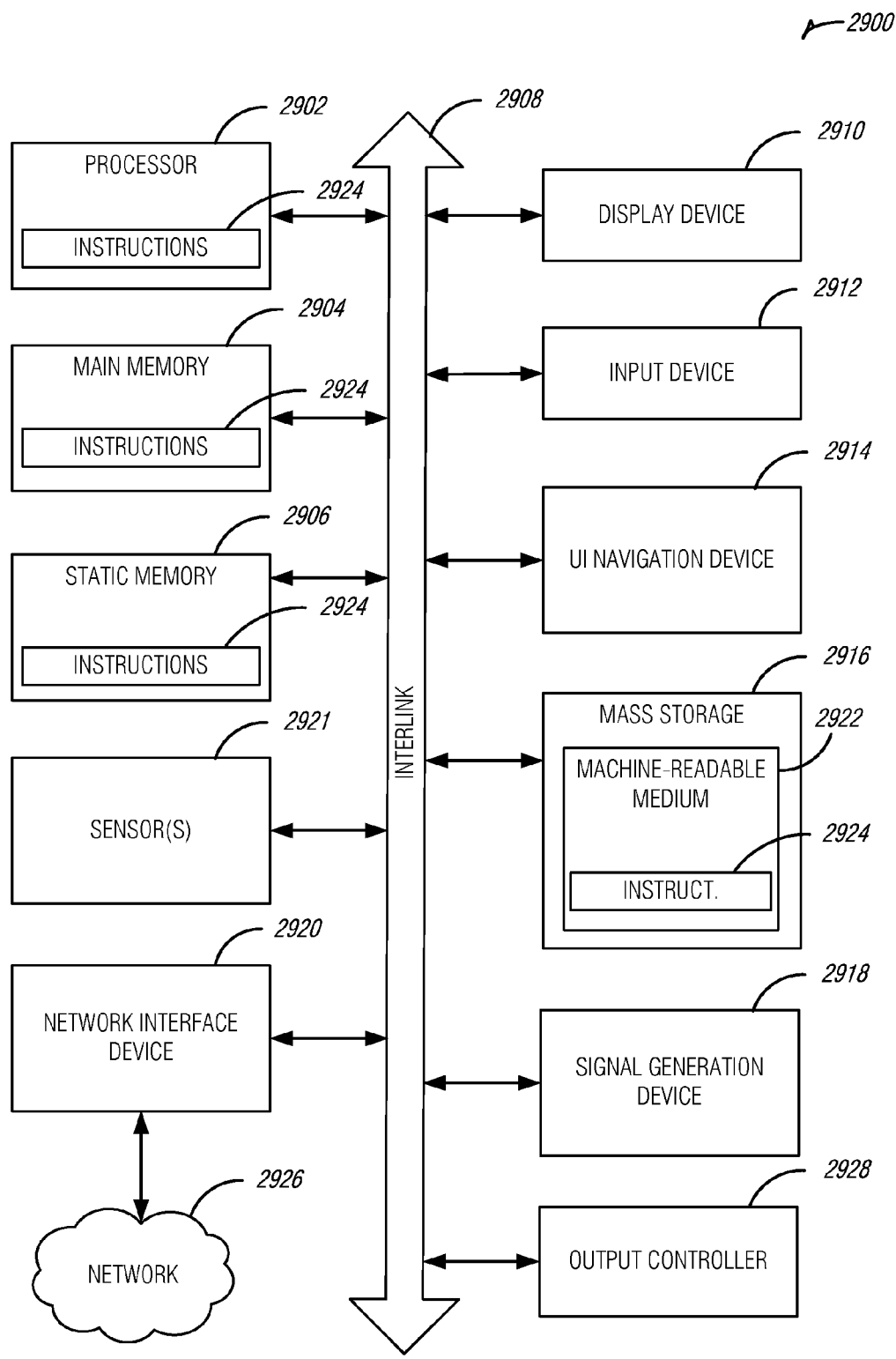
FIG. 29 is a block diagram illustrating a machine in the example form of a computer system, within which a set or sequence of instructions for causing the machine to perform any one of the methodologies discussed herein may be executed, in accordance with various embodiments.

FIG. 29 illustrates a block diagram of an example machine 2900 upon which any one or more of the techniques (e.g., methodologies) discussed herein may be executed, in accordance with various embodiments. In alternative embodiments, the machine 2900 may operate as a standalone device or may be connected (e.g., networked) to other machines. In a networked deployment, the machine 2900 may operate in the capacity of a server machine, a client machine, or both in server-client network environments. In an example, the machine 2900 may act as a peer machine in peer-to-peer (P2P) (or other distributed) network environment. The machine 2900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 2900 may include a hardware processor 2902 (e.g., a central processing unit (CPU), a graphics processing unit (GPU), a hardware processor core, or any combination thereof), a main memory 2904 and a static memory 2906, some or all of which may communicate with each other via an interlink (e.g., bus) 2908. The machine 2900 may further include a display unit 2910, an alphanumeric input device 2912 (e.g., a keyboard), and a user interface (UI) navigation device 2914 (e.g., a mouse). In an example, the display unit 2910, input device 2912 and UI navigation device 2914 may be a touch screen display. The machine 2900 may additionally include a storage device (e.g., drive unit) 2916, a signal generation device 2918 (e.g., a speaker), a network interface device 2920, and one or more sensors 2921, such as a global positioning system (GPS) sensor, compass, accelerometer, or other sensor. The machine 2900 may include an output controller 2928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2916 may include a machine-readable medium 2922 on which is stored one or more sets of data structures or instructions 2924 (e.g., software) embodying or utilized by any one or more of the techniques or functions described herein. The instructions 2924 may also reside, completely or at least partially, within the main memory 2904, within static memory 2906, or within the hardware processor 2902 during execution thereof by the machine 2900. In an example, one or any combination of the hardware processor 2902, the main memory 2904, the static memory 2906, or the storage device 2916 may constitute machine-readable media.

Although the machine readable medium 2922 is illustrated as a single medium, the term "machine readable medium" may include a single medium or multiple media (e.g., a centralized or distributed database, and/or associated caches and servers) configured to store the one or more instructions 2924.

The term "machine-readable medium" may include any medium that is capable of storing, encoding, or carrying instructions for execution by the machine 2900 and that cause the machine 2900 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2924 may further be transmitted or received over a communications network 2926 using a transmission medium via the network interface device 2920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 2920 may include one or more physical jacks (e.g., Ethernet, coaxial, or phone jacks) or one or more antennas to connect to the communications network 2926. In an example, the network interface device 2920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2900, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc., are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system, comprising: a server to receive a recorded video tutorial from a client computer; a web-based interface to receive data to associate with the recorded video tutorial; a database to store the recorded video tutorial and its associated data: a web-based search engine to receive a search query including search terms and to search the database in response to the received search query; and content management software executed by the server to manage a plurality of recorded video tutorials and to provide a list of video tutorials resulting from the search query with links to enable playing of the video tutorials: wherein the web-based search engine adds the search query to a first list of search queries when the search query returned no video tutorials, and wherein the web-based search engine adds the search query to a second list of search queries when a user does not click on any of video tutorials in the list of video tutorials;
    receiving, via the web-based interface: a selection of image content within a frame of the video tutorial as a template image, and a selection of an image modification; analyzing the video tutorial to find within the video tutorial each respective frame containing the template image; and modifying the template image within each respective frame according to the selected image modification;
    wherein the image content is defined by a bounding region, and comprising inverting the bounding region such that an area outside of the bounding region becomes the selection of image content.

2. The system of claim 1, wherein the data to associate with the recorded video tutorial includes keywords related to content within the video.

3. The system of claim 1, wherein the data to associate with the recorded video tutorial includes instructions describing how to perform a process described within the video.

4. The system of claim 3, wherein each respective video tutorial in the list of video tutorials resulting from the received search query is selected based at least partially upon a similarity between a search term in the received search query and the instructions describing how to perform a process described within the respective video tutorial.

5. The system of claim 3, wherein the data to associate with the recorded video tutorial includes a set of timestamps, each respective timestamp in the set of timestamps associated with a respective instruction describing how to perform a process described within the video tutorial, the respective timestamp denoting a time within the video tutorial when the respective instruction is taught.

6. The system of claim 5, wherein the server is to add a respective bookmark at the respective time within the video tutorial when the respective instruction is taught, such that a selection of the respective bookmark during playback of the video tutorial using a video playback program causes the video playback program to jump to the respective time within the video tutorial.

7. The system of claim 1, further comprising:
    an analysis module;
    wherein the web-based interface is further to receive:
    a selection of image content within a frame of the video tutorial as a template image, and a selection of an image modification; and
    wherein the analysis module is to analyze the video tutorial to find within the video tutorial each respective frame containing the template image and modify the template image within each respective frame according to the selected image modification.

8. The system of claim 7, wherein the selection of an image modification includes a replacement image, and wherein the analysis module is to modify the template image within each respective frame by replacing the template image with the replacement image.

9. The system of claim 7, wherein the selection of an image modification includes a selection to obscure the template image by at least one of blurring, opaquing, shading, darkening, dimming, and concealing.

10. The system of claim 7, wherein the analysis module is to recognize a partially obstructed template image within a frame of the video tutorial, the partially obstructed template image including an obstructed portion and an unobstructed portion, and where in the analysis module is to modify the unobstructed portion of the template image according to the selected image modification.

11. A method, comprising: receiving a recorded video tutorial from a client computer; receiving, via a web-based interface, data to associate with the recorded video tutorial; storing the recorded video tutorial and its associated data into a database; receiving, via a web-based search engine, a search query including search terms; searching the database in response to the received search query; returning, to the client computer, a list of video tutorials resulting from the search query with links to enable playing of the video tutorials; receiving a selection of a link to a particular video tutorial; automatically searching text associated with the selected video tutorial for the search terms; and playing the video tutorial beginning at a timestamp that is associated with the text;
    receiving, via the web-based interface; a selection of image content within a frame of the video tutorial as a template image, and a selection of an image modification; analyzing the video tutorial to find within the video tutorial each respective frame containing the template image; and modifying the template image within each respective frame according to the selected image modification;
    wherein the image content is defined by a bounding region, and comprising inverting the bounding region such that an area outside of the bounding region becomes the selection of image content.

12. The method of claim 11, wherein the data to associate with the recorded video tutorial includes keywords related to content within the video.

13. The method of claim 11, wherein the data to associate with the recorded video tutorial includes instructions describing how to perform a process described within the video.

14. The method of claim 13, further comprising:
    selecting each respective video tutorial in the list of video tutorials resulting from the received search query based at least partially upon a similarity between a search term in the received search query and the instructions describing how to perform a process described within the respective video tutorial.

15. The method of claim 13, wherein the data to associate with the recorded video tutorial includes a set of timestamps, each respective timestamp in the set of timestamps associated with a respective instruction describing how to perform a process described within the video tutorial, the respective timestamp denoting a time within the video tutorial when the respective instruction is taught.

16. The method of claim 15, further comprising:
    adding a respective bookmark at the respective time within the video tutorial when the respective instruction is taught, such that a selection of the respective bookmark during playback of the video tutorial using a video playback program causes the video playback program to jump to the respective time within the video tutorial.

17. The method of claim 11, further comprising: modifying the template image within each respective frame by replacing the template image with a replacement image included the image modification selection.

18. The system of claim 11, wherein the selection of an image modification includes a selection to obscure the template image by at least one of blurring, opaquing, shading, darkening, dimming, and concealing.

19. The system of claim 11, further comprising: recognizing a partially obstructed template image within a frame of the video tutorial, the partially obstructed template image including an obstructed portion and an unobstructed portion, and modifying the unobstructed portion of the template image according to the selected image modification.

* * * * *

UNITED STATES PATENT AND TRADEMARK OFFICE
CERTIFICATE OF CORRECTION

PATENT NO. : 9,977,580 B2
APPLICATION NO. : 14/630510
DATED : May 22, 2018
INVENTOR(S) : Stokman et al.

Page 1 of 2

It is certified that error appears in the above-identified patent and that said Letters Patent is hereby corrected as shown below:

In the Claims

In Column 22, Line 64, in Claim 1, after "comprising:", insert --¶--

In Column 22, Line 65, in Claim 1, after "computer;", insert --¶--

In Column 22, Line 66, in Claim 1, after "tutorial;", insert --¶--

In Column 23, Line 1, in Claim 1, delete "data:" and insert --data;¶-- therefor

In Column 23, Line 3, in Claim 1, after "and", insert --¶--

In Column 23, Line 7, in Claim 1, delete "tutorials:" and insert --tutorials;¶-- therefor In Column 24, Line 15, in Claim 11, after "comprising:", insert --¶--

In Column 24, Line 16, in Claim 11, after "computer;", insert --¶--

In Column 24, Line 17, in Claim 11, after "tutorial;", insert --¶--

In Column 24, Line 19, in Claim 11, after "database;", insert --¶--

In Column 24, Line 20, in Claim 11, after "terms;", insert --¶--

In Column 24, Line 21, in Claim 11, after "query;", insert --¶--

In Column 24, Line 24, in Claim 11, after "tutorials;", insert --¶--

In Column 24, Line 25, in Claim 11, after "tutorial;", insert --¶--

Signed and Sealed this
Thirteenth Day of August, 2019

Andrei Iancu
*Director of the United States Patent and Trademark Office*

In Column 24, Line 26, in Claim 11, after "and", insert --¶--

In Column 24, Line 29, in Claim 11, delete "interface;" and insert --interface:-- therefor